(12) United States Patent
Lee et al.

(10) Patent No.: US 12,342,398 B2
(45) Date of Patent: Jun. 24, 2025

(54) ELECTRONIC DEVICE FOR PROVIDING TETHERING SERVICE AND METHOD THEREOF

(71) Applicant: Samsung Electronics Co., Ltd., Suwon-si (KR)

(72) Inventors: Youngkow Lee, Suwon-si (KR); Jungkuk Seo, Suwon-si (KR); Seungjae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 709 days.

(21) Appl. No.: 17/685,790

(22) Filed: Mar. 3, 2022

(65) Prior Publication Data

US 2022/0287117 A1 Sep. 8, 2022

Related U.S. Application Data

(63) Continuation of application No. PCT/KR2021/003106, filed on Mar. 12, 2021.

(30) Foreign Application Priority Data

Mar. 8, 2021 (KR) ........................ 10-2021-0030212

(51) Int. Cl.
*H04W 76/14* (2018.01)
*H04W 48/18* (2009.01)
(Continued)

(52) U.S. Cl.
CPC .......... *H04W 76/14* (2018.02); *H04W 48/18* (2013.01); *H04W 88/04* (2013.01); *H04W 88/14* (2013.01)

(58) Field of Classification Search
CPC ..... H04W 76/14; H04W 48/18; H04W 88/04; H04W 88/14; H04W 4/50; H04W 4/60;
(Continued)

(56) References Cited

U.S. PATENT DOCUMENTS 6,058,106 A * 5/2000 Cudak ................. H04W 52/383
455/554.2
7,254,136 B1 * 8/2007 Gunter ................ H04L 12/2898
370/401
(Continued)

FOREIGN PATENT DOCUMENTS

EP 2 385 727 A1 11/2011
KR 10-2011-0042133 A 4/2011
(Continued)

OTHER PUBLICATIONS

Extended European Search Report dated Jul. 2, 2024; European Appln. No. 21930448.2-1215 / 4290928 PCT/KR2021003106.

*Primary Examiner* — Ayaz R Sheikh
*Assistant Examiner* — Tarell A Hampton
(74) *Attorney, Agent, or Firm* — Jefferson IP Law, LLP

(57) ABSTRACT

An electronic device for providing a tethering service in a wireless communication system and a method thereof are provided. The electronic device includes a wireless communication module, and at least one processor operatively coupled to the wireless communication module. The at least one processor may be configured to establish a tethering connection between the electronic device and an external electronic device through the wireless communication module, obtain at least one piece of information related to an Internet connection of at least one application executable in the external electronic device, select a backbone network for a specified application among the at least one application executable in the external electronic device based on the at least one piece of information, map a tethering connection for the specified application to the selected backbone network, and transmit data received from the specified application of the external electronic device to the mapped backbone network.

16 Claims, 23 Drawing Sheets

(51) Int. Cl.
*H04W 88/04* (2009.01)
*H04W 88/14* (2009.01)

(58) Field of Classification Search
CPC ..... H04W 28/02; H04W 48/00; H04W 88/06;
H04W 84/18; H04W 92/10; H04W 92/18;
H04W 76/23; H04W 48/17; H04L 65/40;
H04L 67/61
See application file for complete search history.

(56) References Cited

U.S. PATENT DOCUMENTS

| | | | |
|---|---|---|---|
| 8,949,439 B1* | 2/2015 | Sahuguet | H04W 88/04 709/227 |
| 10,607,456 B1* | 3/2020 | Benkreira | G06Q 20/4015 |
| 2007/0127520 A1 | 6/2007 | Lioy | |
| 2007/0168553 A1* | 7/2007 | Jones | H04W 12/50 709/245 |
| 2007/0173283 A1* | 7/2007 | Livet | H04W 88/06 455/552.1 |
| 2010/0267368 A1 | 10/2010 | Masputra | |
| 2011/0191484 A1* | 8/2011 | Babbar | H04L 69/32 709/228 |
| 2012/0027059 A1 | 2/2012 | Zhao et al. | |
| 2012/0106475 A1 | 5/2012 | Jung | |
| 2012/0240197 A1 | 9/2012 | Tran et al. | |
| 2013/0229995 A1 | 9/2013 | Cai et al. | |
| 2014/0254499 A1* | 9/2014 | Hassan | H04W 12/08 370/329 |
| 2014/0337923 A1 | 11/2014 | Anders et al. | |
| 2014/0362712 A1* | 12/2014 | Agarwal | H04W 48/18 370/252 |
| 2015/0282040 A1 | 10/2015 | Daniel et al. | |
| 2015/0358757 A1* | 12/2015 | Ford | H04L 67/75 455/418 |
| 2016/0007394 A1 | 1/2016 | Hassan et al. | |
| 2016/0112939 A1* | 4/2016 | Senese | H04W 88/04 370/329 |
| 2016/0142963 A1* | 5/2016 | Salkintzis | H04L 45/308 370/329 |
| 2016/0262082 A1* | 9/2016 | Flynn | H04W 4/80 |
| 2016/0262205 A1* | 9/2016 | Flynn | H04L 67/10 |
| 2016/0286588 A1* | 9/2016 | Gulliksson | H04W 4/80 |
| 2016/0295622 A1 | 10/2016 | Huang et al. | |
| 2017/0034860 A1 | 2/2017 | Berggren et al. | |
| 2018/0279158 A1 | 9/2018 | Choi et al. | |
| 2019/0357277 A1 | 11/2019 | Park et al. | |
| 2020/0214081 A1* | 7/2020 | Spanton | G06F 16/1834 |
| 2021/0185600 A1* | 6/2021 | Smith | H04L 45/24 |

FOREIGN PATENT DOCUMENTS

| | | |
|---|---|---|
| KR | 10-2014-0083062 A | 7/2014 |
| KR | 10-1806439 B1 | 12/2017 |
| KR | 10-2018-0087046 A | 8/2018 |
| KR | 10-2018-0107997 A | 10/2018 |
| KR | 10-2019-0132723 A | 11/2019 |

* cited by examiner

1500

| APP ID | PREFERRED N/W |
|---|---|
| APP#1 | Cellular/5G only |
| APP#2 | Any |
| APP#3 | Cellular/LTE only |
| APP#4 | Lowest RTT |
| APP#5 | Any |
| ⋮ | ⋮ |

| APP ID | N/W SWITCHING ALLOWED |
|---|---|
| APP#11 | N |
| APP#12 | N |
| APP#13 | N |
| APP#14 | Y |
| APP#15 | N |
| ⋮ | ⋮ |

FIG.16

ELECTRONIC DEVICE FOR PROVIDING TETHERING SERVICE AND METHOD THEREOF

CROSS-REFERENCE TO RELATED APPLICATION(S)

This application is a continuation application, claiming priority under § 365(c), of an International application No. PCT/KR2021/003106, filed on Mar. 12, 2021, which is based on and claims the benefit of a Korean patent application number 10-2021-0030212, filed on Mar. 8, 2021, in the Korean Intellectual Property Office, the disclosure of which is incorporated by reference herein in its entirety.

BACKGROUND

1. Field

The disclosure relates to an electronic device for providing a tethering service to an external electronic device and a method thereof. More particularly, the disclosure relates to an electronic device for selecting a backbone network for a tethering service and a method thereof.

2. Description of Related Art

Wireless communication systems are being developed extensively to provide various types of communication services, such as voice or data. In general, a wireless communication system is a multiple access system that may support communication with multiple users by sharing available system resources (e.g., time resource, frequency resource, bandwidth resources, or output power resources). Multiple access systems include, for example, a code division multiple access (CDMA) system, a frequency division multiple access (FDMA) system, a time division multiple access (TDMA) system, an orthogonal frequency division multiple access (OFDMA) system, a single carrier-frequency division multiple access (SC-FDMA) system, and a multi-carrier-frequency division multiple access (MC-FDMA) system.

With the development of information and communication technology, various wireless communication technologies are under development. Among them, wireless local area network (WLAN) is a wireless computer networking technology that allows devices such as smartphones, personal digital assistants (PDAs), and laptop computers to wirelessly access the Internet in a limited area such as homes, schools, businesses, or commercial facilities based on a radio frequency technology. In WLAN, all devices that may be connected to a wireless medium are referred to as stations (STAs), and the STAs may operate as wireless access points (APs) or clients. An AP may be a base station (BS) for a wireless network, acting as a wireless router. The AP may provide Internet services by transmitting and receiving radio frequency signals between devices capable of wireless communication. Devices other than the AP may access the Internet through the AP.

A recent WLAN provides processes through which a wireless-fidelity (WiFi) device may easily and safely connect to a network based on the WiFi standard provided by the WiFi alliance (WFA). Tethering refers to a function of sharing an Internet connection of a mobile device capable of accessing a network with another device. The connection of another device to the mobile device that provides tethering may be established by a wireless access technology (RAT) such as WLAN (i.e. WiFi) or Bluetooth, or a physical connection means using a cable, such as a universal serial bus (USB). When a tethering connection is based on WLAN, the mobile device is a portable wireless AP that forms a personal hotspot or mobile hotspot (MHS), which is a physical area that allows the other device to connect to the Internet. The mobile device (or host device) that supports a mobile hotspot may provide an Internet service of an external network through a WiFi connection to another device (or a client device) receiving the tethering service. Compared to other wireless access technologies such as Bluetooth, tethering may provide Internet services at a high speed to other devices at a great distance.

Recently, a mobile tethering service has been actively provided in various electronic devices including personal devices. In particular, as multimedia viewing or remote lectures are activated and the use of tablet devices supporting large screens compared to personal mobile phones increases, the use of the tethering service through personal mobile phones is further increasing. A mobile hotspot, which is a representative tethering service, uses WiFi for a connection between a client device and a host device that provides the tethering service to support a high transmission speed between the two devices. Therefore, the tethering service is increasingly used. In addition, the trend is that a host device providing a mobile hotspot is extensively supported to use a USB Ethernet, a 60 GHz network, or a WiFi network as well as a conventional cellular network (e.g. $3^{rd}$ generation (3G), $4^{th}$ generation (4G), long-term evolution (LTE), new radio (NR), or 5th generation (5G)) as a backbone network for a mobile hotspot application (or a tethering application), and an Internet connection using this backbone network may be shared with multiple client devices.

The above information is presented as background information only to assist with an understanding of the disclosure. No determination has been made, and no assertion is made, as to whether any of the above might be applicable as prior art with regard to the disclosure.

SUMMARY

The transmission performance and quality of the Internet service used by the client device may be closely related to the performance of the backbone network to which the host device is connected as well as the network performance between the client device and the host device. As the connection between the host device and the client device supports an increasing rate, a high-speed Internet service may be provided to a plurality of client devices based on the tethering service, and the host device may provide a differentiated service using a packet transmission priority and a separate queue which are suitable for the service of the client device, based on a quality of service (QoS) field such as WiFi multimedia (WMM). However, the existing tethering service may have limitations in sufficiently satisfying a QoS requirement for the service of the client device because the host device provides an Internet service to the client device by using the existing backbone network to which the host device is connected. Moreover, due to the increase of data traffic, the performance degradation of a large number of client devices may not be overcome.

Although a service for allocating an additional bandwidth of the backbone network to the tethering service of the client device has been proposed, this service may incur additional charges, and due to a change in channel characteristics according to the mobility of the host device providing the mobile hotspot, it is not easy to continuously secure the bandwidth of the backbone network, and thus the stable Internet service of the client device may not be guaranteed. Therefore, there is a need for operating multiple networks in the host device according to a changing network condition or a request of the client device.

In addition, in various network situations using mobile hotspots, when a service requested by the client device is blocked due to the security and stability of the backbone network to which the host device connects and a firewall, the Internet service may not be available in the client device.

Since recent electronic devices are capable of supporting multiple networks, they may be configured to use a separate network (e.g., a cellular network or a WiFi network) for each service. Further, the electronic devices may support a function of setting a network preference for each application in consideration of application characteristics, a function of supporting network switching according to a network policy that restricts some services, and a function of selecting a network connected to each application. Therefore, an electronic device supporting a mobile hotspot needs to support multiple networks for a backbone network connection for the tethering service.

Aspects of the disclosure are to address at least the above-mentioned problems and/or disadvantages and to provide at least the advantages described below. Accordingly, an aspect of the disclosure is to provide a stable Internet service to a client device by supporting connections to multiple networks based on configuration information related to backbone network connections of applications executable in a client device in an electronic device providing a mobile hotspot-based tethering service.

It will be appreciated by persons skilled in the art that the objects that can be achieved with the disclosure are not limited to what has been particularly described hereinabove and other objects of the disclosure will be more clearly understood from the following detailed description taken in conjunction with the accompanying drawings.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication module, and at least one processor operatively coupled to the wireless communication module. The at least one processor may be configured to establish a tethering connection between the electronic device and an external electronic device through the wireless communication module, obtain at least one piece of information related to an Internet connection of at least one application executable in the external electronic device, select a backbone network for a specified application among the at least one application executable in the external electronic device based on the at least one piece of information, map a tethering connection for the specified application to the selected backbone network, and transmit data received from the specified application of the external electronic device to the mapped backbone network.

In accordance with another aspect of the disclosure, a method performed by an electronic device is provided. The method includes establishing a tethering connection between the electronic device and an external electronic device through a wireless communication module, obtaining at least one piece of information related to an Internet connection of at least one application executable in the external electronic device, selecting a backbone network for a specified application among the at least one application executable in the external electronic device, based on the at least one piece of information, mapping a tethering connection for the specified application to the selected backbone network, and transmitting data received from the specified application of the external electronic device to the mapped backbone network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 15 is a diagram illustrating an example of preferred network information according to an embodiment of the disclosure;

FIG. 16 is a diagram illustrating an example of network switching permission information according to an embodiment of the disclosure;

Throughout the drawings, it should be noted that like reference numbers are used to depict the same or similar elements, features, and structures.

DETAILED DESCRIPTION

Figure 1:
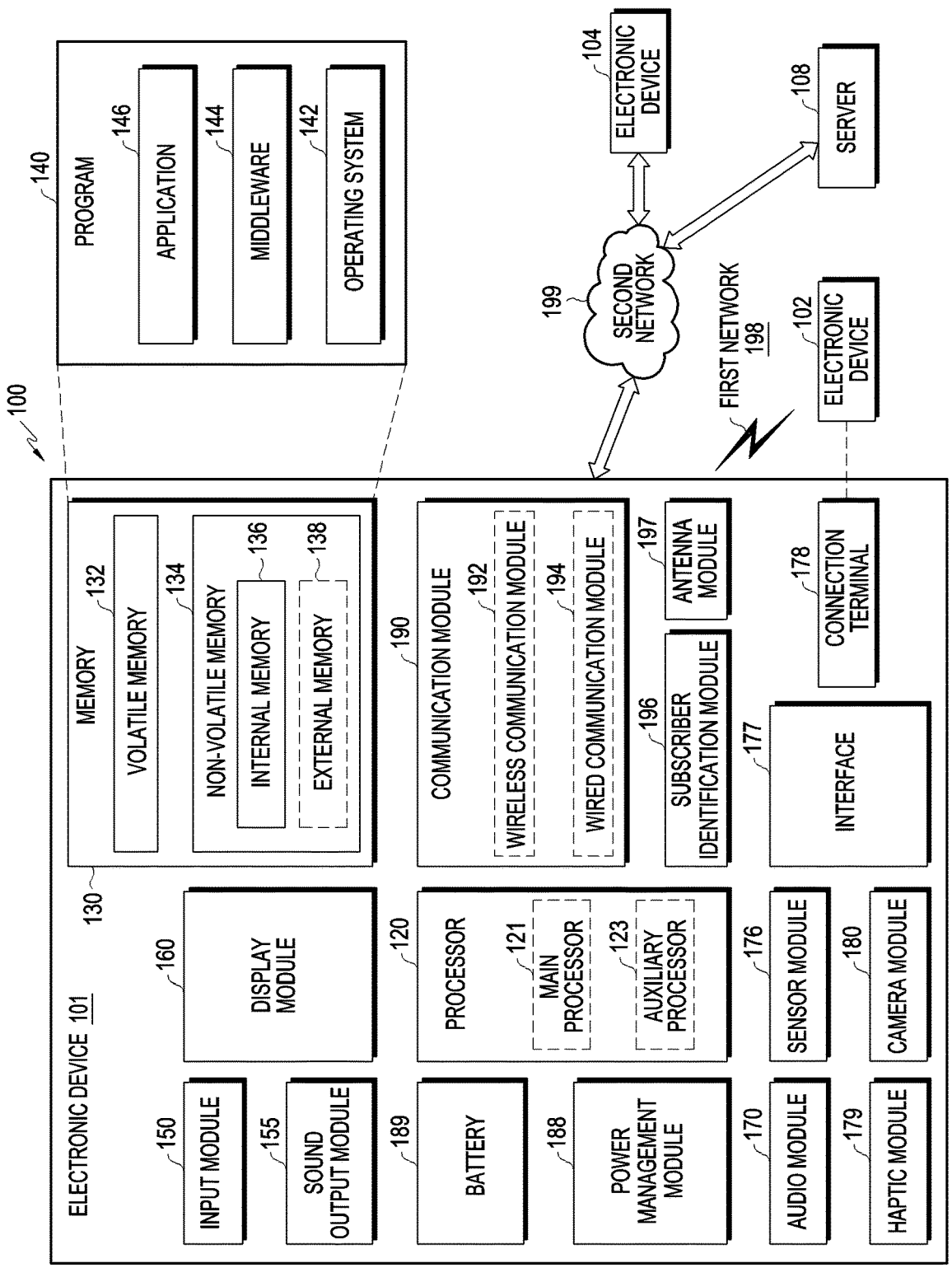
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that singular forms "a," "an," and "the" include plural referents unless the context clearly dictates otherwise. Thus, for example, reference to "a component surface" includes reference to one or more of such surfaces.

The term as used in the disclosure, first or second may be used for the names of various components, not limiting the components. These expressions are used to distinguish one component from another component. For example, a first component may be referred to as a second component and vice versa without departing the scope of the disclosure.

It is to be understood that if an element "connected to" or "coupled to" another element, it means that the element may be coupled to the other element directly or via a third element. On the other hand, when it is said that a component is "directly connected to" or "directly coupled to" another component, it may be understood that there is no other component between the components.

Various embodiments of the disclosure will be described below in detail with reference to the attached drawings. The same or similar components are denoted by the same reference numerals throughout the drawings, and their redundant description will be avoided. In the following description of embodiments of the disclosure, a detailed description of well-known technologies incorporated herein will be omitted, lest it should obscure the subject matter of the embodiments of the disclosure. Further, the attached drawings are intended to help understanding of the embodiments of the disclosure, not limiting the scope and spirit of the disclosure, and it is to be understood that the disclosure covers all modifications, equivalents, and alternatives within the scope and spirit of the disclosure.

In describing various embodiments of the disclosure in detail, reference will be made to standards provided by the Institute of Electrical and Electronics Engineers (IEEE), which is a wireless access standardization organization, and WiFi Alliance (WFA). However, those skilled in the art will understand that the subject matter of the disclosure is applicable to other communication systems having a similar technical background with slight modifications made without departing from the scope of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
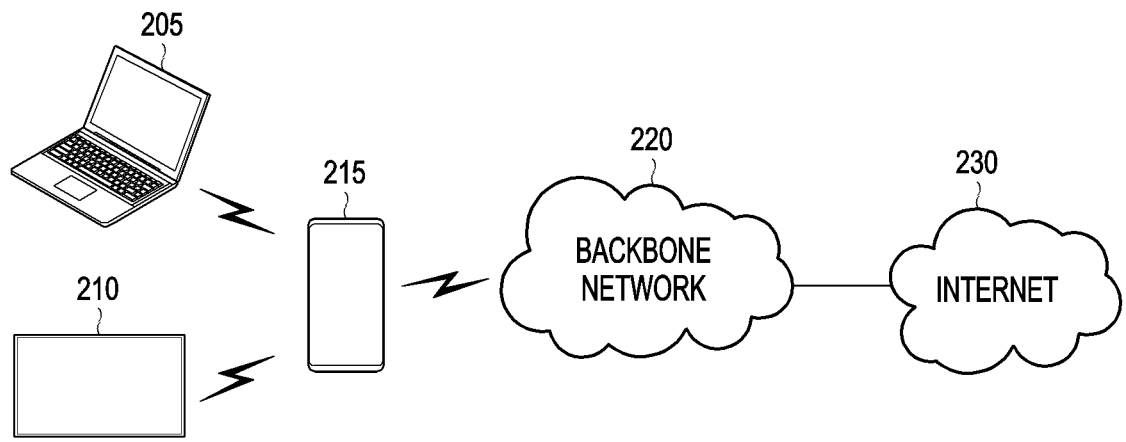
FIG. 2 is a diagram illustrating the configuration of a wireless communication system that provides a tethering service according to an embodiment of the disclosure.

FIG. 2 illustrates the configuration of a wireless communication system that provides a tethering service according to an embodiment of the disclosure.

Referring to FIG. 2, an electronic device 215 (e.g., the electronic device 101 of FIG. 1) may include a communication module (e.g., the wireless communication module 192 of FIG. 1) including a cellular communication circuit and a WLAN communication circuit supporting WiFi communication. The electronic device 215 may support a mobile hotspot that shares a connection to the Internet 230 with at least one external electronic device (e.g., a first external electronic device 205 or a second external electronic device 210). In a mobile hotspot mode, the electronic device 215 may establish a WiFi-based tethering connection with the at least one external electronic device (e.g., the first external electronic device 205 or the second external electronic device 210) through the WLAN communication circuit and operate as a host device that provides a tethering service to the external electronic device (e.g., the first external electronic device 205 or the second external electronic device 210) through the tethering connection. The external electronic device (e.g., the first external electronic device 205 or the second external electronic device 210), which is an electronic device capable of supporting WiFi communication (e.g., the electronic device 101 of FIG. 1 or a computing device equipped with a communication function such as a notebook, tablet, or laptop computer), may be a client device using the tethering service in the mobile hotspot mode.

The electronic device 215 may connect the tethering connection of the external electronic device (e.g., the first external electronic device 205 or the second external electronic device 210) to the Internet 230 through a backbone network 220. The backbone network 220 may interconnect the connection between the external electronic device (e.g., the first external electronic device 205 or the second external electronic device 210) and the electronic device 215 to the Internet 230. In an embodiment, the backbone network 220 may include at least one of a cellular network including a cellular base station using a cellular radio access technology or a WiFi network including an AP using a WiFi technology. The backbone network 220 may be the same as or different from a core network used for data communication of the electronic device 215.

Figure 3:
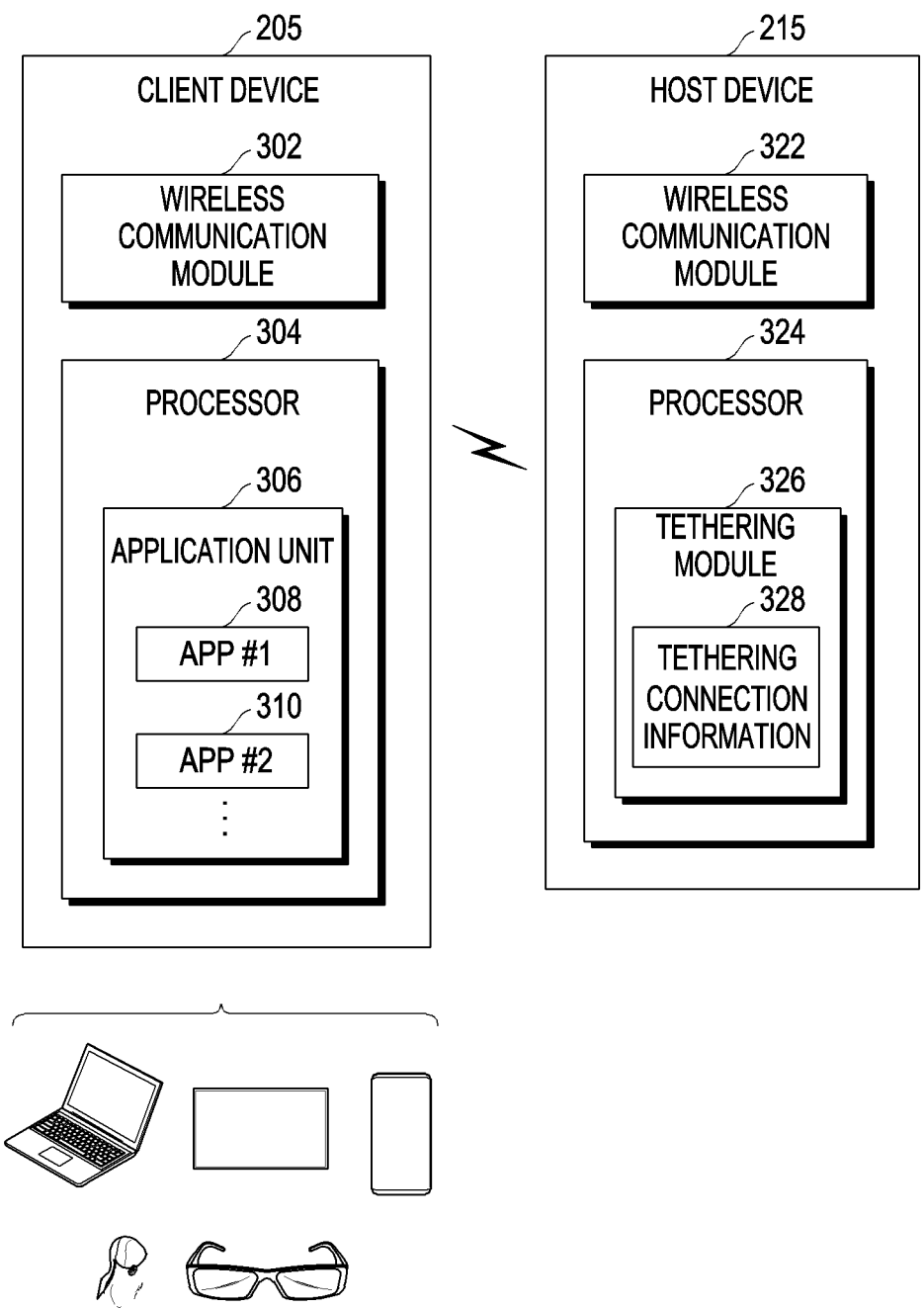
FIG. 3 is a block diagram illustrating an implementation example of a host device and a client device according to an embodiment of the disclosure.

FIG. 3 is a block diagram illustrating an implementation example of a host device (e.g., the electronic device 215) and a client device (e.g., the first external electronic device 205 or the second external electronic device 210) according to an embodiment of the disclosure.

Referring to FIG. 3, the host device (e.g., the electronic device 215) is an electronic device (e.g., the electronic device 101) supporting a mobile hotspot function, and may include a wireless communication module 322 (e.g., the wireless communication module 192 of FIG. 1) that transmits and receives radio signals to and from an external electronic device, for example, the client device (e.g., the first external electronic device 205 or the second external electronic device 210) and/or a network entity of the backbone network by using one or more antennas. The host device (e.g., the electronic device 215) may include a processor 324 (e.g., the processor 120 of FIG. 1), which may be implemented with one or more single-core processors or one or more multi-core processors. The processor 324 may include a tethering module 326 for a tethering operation of the host device (e.g., the electronic device 215).

The wireless communication module 322 and the processor 324 may process various radio control functions to communicate with one or more wireless networks according to one or more radio access technologies (RATs). For example, the wireless technologies may include worldwide interoperability for microwave access (WiMax), WiFi, global system for mobile communications (GSM), enhanced data rates for GSM (EDGE), GSM EDGE radio access network (GERAN), universal mobile telecommunication system (UMTS), UTRAN terrestrial radio access network (UTRAN), 3G, 4G, 5G, or beyond-5G, which has already been developed or may be developed in the future. In an embodiment, the wireless communication module 322 may include a cellular communication module capable of connecting to the Internet through a cellular base station in the mobile hotspot mode. In an embodiment, the wireless communication module 322 is a WLAN communication module capable of connecting to the Internet and at the same time, to at least one client device (e.g., the first external electronic device 205 or the second external electronic device 210). In an embodiment, the wireless communication module 322 may simultaneously maintain an Internet connection through an AP and an Internet connection through a cellular base station in the mobile hotspot mode, and/or may simultaneously maintain a WiFi connection to at least one client device (e.g., the first external electronic device 205 or the second external electronic device 210), for tethering service.

The tethering module 326 is a software or hardware component responsible for a function of wirelessly tethering the client device (e.g., the first external electronic device 205 or the second external electronic device 210) to the host device (e.g., the electronic device 215), and may be driven and executed by the processor 324. The tethering module 326 may include tethering connection information 328 and map a tethering connection to at least one client device (e.g., the first external electronic device 205 or the second external electronic device 210) to an Internet connection to a single backbone network. When radio resources such as a radio frequency bandwidth is allocated to the client device (e.g., the first external electronic device 205 or the second external electronic device 210) by the host device (e.g., the electronic device 215), a tethering connection may be established between the host device (e.g., the electronic device 215) and the client device (e.g., the first external electronic device 205 or the second external electronic device 210) in the radio resources. During the tethering service, the tethering module 326 may transmit packets received from the client device (e.g., the first external electronic device 205 or the second external electronic device 210) to the backbone network through the tethering connection by the wireless communication module 322, and identify packets related to a network service of the client device (e.g., the first external electronic device 205 or the second external electronic device 210) among packets received from the backbone network by the wireless communication module 322 and transmit the identified packets to the client device (e.g., the first external electronic device 205 or the second external electronic device 210) through the tethering connection.

The tethering connection information 328 may indicate various types of tethering information and a set of tethering parameters, required for the operation of the tethering module 326. In an embodiment, the tethering connection information 328 may include records about devices being tethered to and/or previously tethered to the host device (e.g., the electronic device 215) and information collected from the devices. In an embodiment, the tethering connection information 328 may include at least one of preferred network information, network switching permission information, and/or network connection permission information. The preferred network information and the network switching permission information may be referred to as application setting information according to a user setting. A more detailed description of the illustrated information will be provided later. While the wireless communication module 322 and the tethering module 326 are illustrated separately in FIG. 3, according to various embodiments, the wireless communication module 322 and the tethering module 326 may be integrated as one component. For example, the tethering module 326 may be included in the wireless communication module 322. While not shown, in an embodiment, the electronic device 215 may further include a communication module that provides the Internet service to the client device (e.g., the first external electronic device 205 or the second external electronic device 210) through the tethering connection. The communication module may be connected to the client device (e.g., the first external electronic device 205 or the second external electronic device 210) in a short-range wireless communication scheme (e.g., Bluetooth) or a wired communication scheme (e.g., USB).

The client device (e.g., the first external electronic device 205 or the second external electronic device 210) is an electronic device (e.g., the electronic device 101) supporting a WiFi-based wireless communication function, and may include a wireless communication module 302 (e.g., the wireless communication module 192 of FIG. 1) for transmitting and receiving wireless signals to and from an external electronic device, for example, the host device (e.g., the electronic device 215) by using one or more antennas. The client device (e.g., the first external electronic device 205 or the second external electronic device 210) may include a processor 304, which may be implemented with one or more single-core processors or one or more multi-core processors. (e.g., the processor 120 of FIG. 1). The processor 304 may include an application unit 306 including a plurality of applications 308 and 310. The processor 304 may run/execute at least one of the plurality of applications 308 and 310, collect and manage tethering connection information for the plurality of applications 308 and 310, and transmit the tethering connection information to the host device (e.g., the electronic device 215) according to a request or when needed.

The plurality of applications 308 and 310 may refer to functions of performing various tasks through the client device (e.g., the first external electronic device 205 or the second external electronic device 210). In an embodiment, at least one application may be run locally or in a network environment. In an embodiment, the at least one application may perform communication in various forms through the wireless communication module 302, such as a web browser, an email client, an Internet-based voice call, a messaging service, content sharing, or a social network service (SNS). In an embodiment, the at least one application may be implemented as a communication service installed on the client device (e.g., the first external electronic device 205 or the second external electronic device 210), accessed through the Internet, or controlled remotely.

The wireless communication module 302 and the processor 304 may process various radio control functions to communicate with at least one wireless network according to at least one RAT. In an embodiment, the wireless communication module 302 may include a WLAN communication module that may connect to the WiFi Internet and/or the host device (e.g., the electronic device 215). In an embodiment, the wireless communication module 302 may simultaneously maintain at least one of a WiFi Internet connection through an AP, an Internet connection through a cellular base station, or a tethering connection to the host device (e.g., the electronic device 215) for the tethering service. In an embodiment, the wireless communication module 302 may use the tethering service through the tethering connection to the host device (e.g., the electronic device 215) in the mobile hotspot mode. During the tethering service, the wireless communication module 302 may share the Internet connection of the wireless communication module 322 of the host device (e.g., the electronic device 215) by the tethering module 326 of the host device (e.g., the electronic device 215). During the tethering service, the wireless communication module 302 may recognize the host device (e.g., the electronic device 215) as a mobile AP. The wireless communication module 302 may receive packets from the host device (e.g., the electronic device 215) through the tethering connection, transmit the received packets to at least one application 308 or 310 in the application unit 306, and transmit packets to be transmitted from the at least one application 308 or 310 of the application unit 306 to the Internet to the host device (e.g., electronic device 215) through the tethering connection.

The electronic device (e.g., the electronic device 101 or the electronic device 215) according to an embodiment may include a wireless communication module (e.g., the wireless communication module 192) and at least one processor (e.g., the processor 120) operatively coupled to the wireless communication module, and the at least one processor may be configured to establish a tethering connection between the electronic device and the external electronic device (e.g., the first external electronic device 205 or the second external electronic device) through the wireless communication module, obtain at least one piece of information related to an Internet connection of at least one application executable in the external electronic device, select a backbone network for a specified application of the external electronic device based on the at least one piece of information, map the tethering connection for the specified application to the selected backbone network, and transmit data received from specified application of the external electronic device to the mapped backbone network.

The selected backbone network may include at least one of at least one cellular network or at least one Wi-Fi network.

In an embodiment, the at least one piece of information may include preferred network information indicating a network type specified for each of at least one application executable in the external electronic device, and the network type may be at least one of cellular network only, minimum round trip delay (RTT) network first, WiFi network only, or Any.

In an embodiment, the at least one piece of information may include network switching permission information indicating that the WiFi network of each application is preferred, and indicating whether switching to a cellular network is allowed, when the WiFi network is not accessible, for each of the at least one application executable in the external electronic device.

In an embodiment, the at least one piece of information may include network connection permission information indicating whether the specified application is blocked or all applications are allowed, for each of the at least one AP.

In an embodiment, the at least one processor may obtain the at least one piece of information from at least one of a user, a server, or the external electronic device.

In an embodiment, the at least one processor may determine whether configuration information related to the Internet connection of the specified application is stored. In the absence of the configuration information, the at least one processor may determine whether the external electronic device uses the same user account as the electronic device. When the external electronic device uses the same user account as the electronic device, the at least one processor may obtain configuration information related to the Internet connection of the specified application, set for the user account.

In an embodiment, the at least one processor may determine whether the backbone network is capable of supporting a QoS indicated by QoS information related to the specified application, referring to the QoS information.

In an embodiment, the at least one processor may determine whether the specified application is for a cellular network only based on the at least one piece of information. When the specified application is not for a cellular network only and a connection is possible between the electronic device and a WiFi network, the at least one processor searches for a WiFi network suitable for the QoS information related to the specified application, referring to the QoS information, and select the detected WiFi network as a backbone network. When the specified application is not for a cellular network only and a connection to a WiFi network is not possible, the at least one processor may determine whether switching to the cellular network is allowed for the specified application. When switching to the cellular network is allowed for the specified application, the at least one processor may select the cellular network as a backbone network. When switching to the cellular network is not allowed for the specified application, the at least one processor may terminate the tethering service.

In an embodiment, the at least one processor may determine whether the tethering service of the specified application may be provided through a first backbone network to which the electronic device is currently connected, based on the at least one piece of information. When the tethering service is not available for the specified application through the first backbone network, the at least one processor may search for a second backbone network for the specified application and connect to the second backbone network for the tethering service of the specified application, while maintaining the connection to the first backbone network for data communication of the electronic device.

Various embodiments of the disclosure relate to operating an electronic device (e.g., the electronic device 215) that provides network sharing by tethering, such as a mobile hotspot, and an external electronic device (e.g., the first external electronic device 205 or the second external electronic device 210) that obtains the Internet service through the electronic device. In various embodiments, the electronic device may control a simultaneous connection to at least one backbone network for at least one external electronic device according to configuration information about network services respectively corresponding to applications executable in the external electronic device, and map each of the network services to a corresponding backbone network.

In various embodiments, the electronic device obtains information about a user account, a configuration for an application/service between the external electronic device and the electronic device, and connection permission information for each router, and efficiently operates the Internet service for the external electronic device based on the obtained information. In various embodiments, the electronic device may identify a user's intention for the Internet connection of the external electronic device and apply the intention to the Internet connection of the external electronic device, for billing and saving power consumption.

Figure 4:
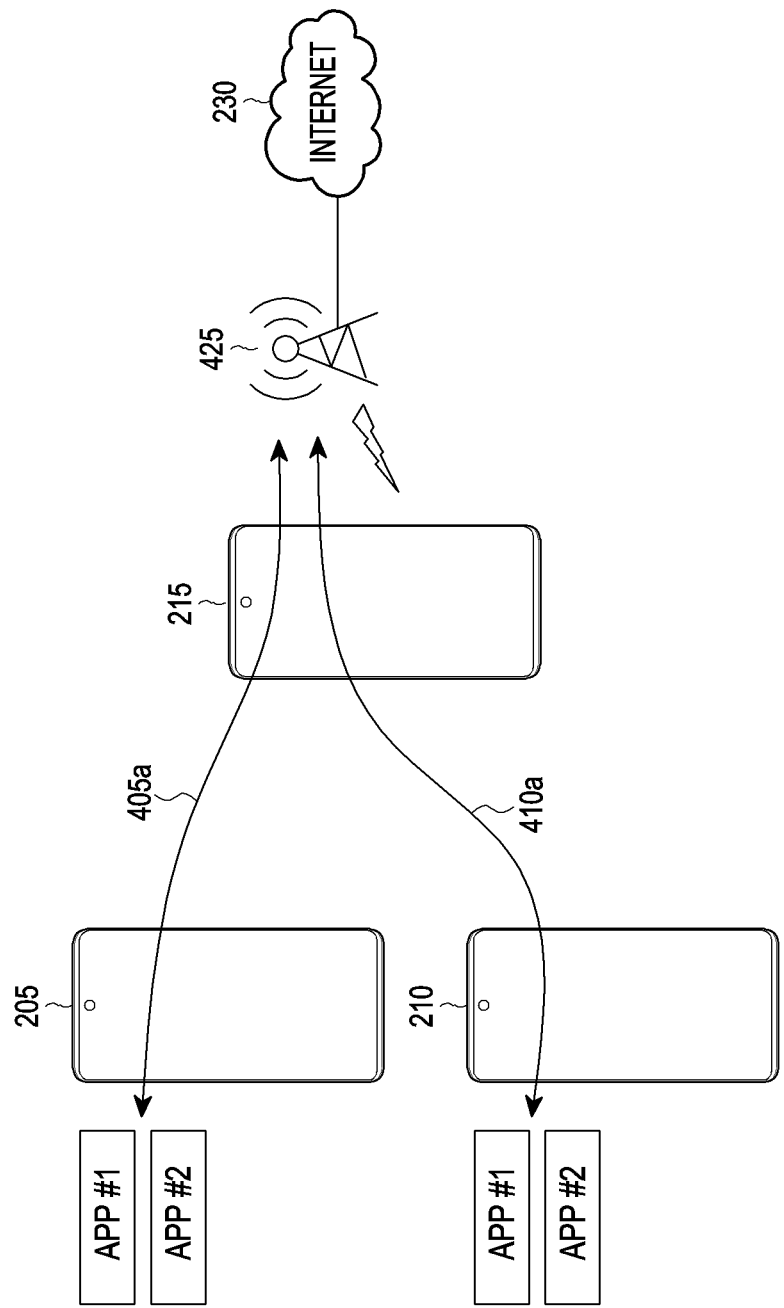
FIG. 4 is a diagram illustrating a tethering service of an electronic device connected to a cellular network according to an embodiment of the disclosure.

FIG. 4 is a diagram illustrating a tethering service of an electronic device connected to a cellular network according to an embodiment of the disclosure.

Referring to FIG. 4, the electronic device 215 may connect to a cellular base station (BS) 425 by an RAT such as cellular/LTE or cellular/5G and connect to the Internet 230 through a cellular network including the cellular BS 425. When the tethering service is required, the electronic device 215 may operate as a host device that provides the tethering service to external electronic devices (e.g., the first external electronic device 205 or the second external electronic device 210) and share the connection to the Internet 230 through the cellular network with the external electronic devices (e.g., the first external electronic device 205 or the second external electronic device 210) by the tethering service. Accordingly, the backbone network for the tethering service of the external electronic devices (e.g., the first external electronic device 205 or the second external electronic device 210) may be the cellular network.

The first external electronic device 205 may include a first application APP#1 and a second application APP#2 and have a tethering connection 405a to the electronic device 215 through WiFi. Data for the first application and the second application may share the tethering connection 405a and be transmitted to the Internet 230 through the cellular BS 425 by the electronic device 215. In the first external electronic device 205, the tethering connection 405a includes a connection for the first application and a connection for the second application, and both of the first application and the second application of the first external electronic device 205 may have the cellular network as their backbone network.

Similarly, the second external electronic device 210 may include the first application APP#1 and the second application APP#2 and have a tethering connection 410a to the electronic device 215 through WiFi. The first application of the second external electronic device 210 may have the same APP ID as the first application of the first external electronic device 205. Similarly, the second application of the second external electronic device 210 may have the same APP ID as the second application of the first external electronic device 205. Data for the first application and data for the second application in the second external electronic device 210 share the tethering connection 410a, and may be transmitted to the Internet 230 via the tethering connection 410a through the cellular BS 425 by the electronic device 215. In the second external electronic device 210, the tethering connection 410a may include a connection for the first application and a connection for the second application, and both of the first application and the second application of the second external electronic device 210 may have the cellular network as their backbone network.

According to various embodiments, in each external electronic device (e.g., the first external electronic device 205 or the second external electronic device 210), the first application and the second application may have different QoS information and service requirements and/or user settings. For example, the first application may be a financial application requiring higher security. For example, the second application may be an application supporting a streaming service requiring higher real-time processing. For example, the first external electronic device 205 may not allow a cellular network requiring a higher charge to be used as a backbone network for at least some applications. Accordingly, it may not be preferable to apply an Internet connection through the cellular BS 425 used by the electronic device 215 commonly to the first application and the second application of each external electronic device (e.g., the first external electronic device 205 or the second external electronic device 210). In various embodiments to be described later, the electronic device 215 may select a backbone network individually for each of the first application and the second application of each external electronic device (e.g., the first external electronic device 205 or the second external electronic device 210), referring to configuration information for the first application and the second application in the first external electronic device 205 and the second external electronic device 210. A detailed description of the configuration information in an embodiment will be described later with reference to FIGS. 15, 16 and 19.

Figure 5:
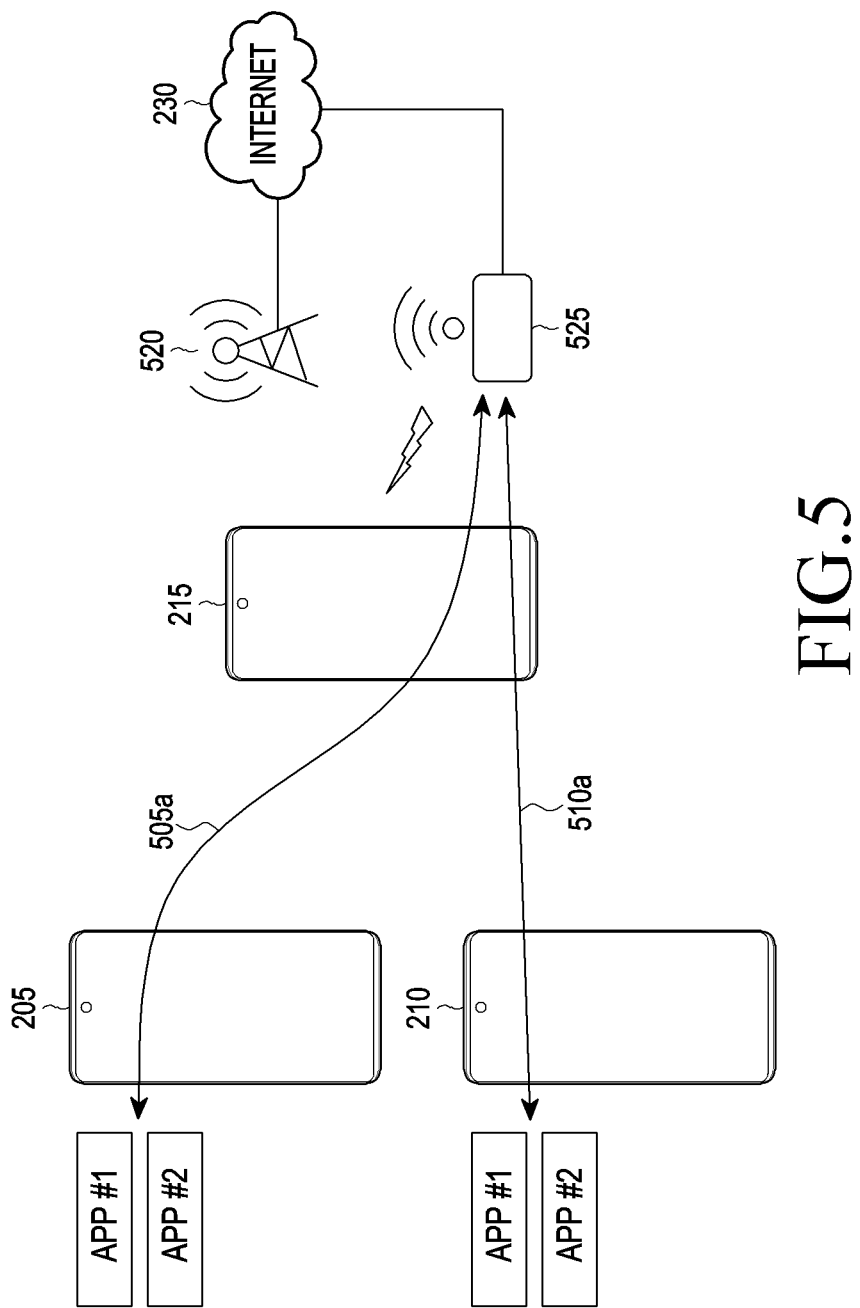
FIG. 5 is a diagram illustrating a tethering service of an electronic device connected to a WiFi network according to an embodiment of the disclosure.

FIG. 5 is a diagram illustrating a tethering service of an electronic device connected to a WiFi network according to an embodiment of the disclosure.

Referring to FIG. 5, the electronic device 215 may access an AP 525 by WiFi technology and connect to the Internet 230 through a WiFi network including the AP 525, instead of through BS 520. When the tethering service is required, the electronic device 215 may operate as a host device that provides the tethering service to external electronic devices (e.g., the first external electronic device 205 or the second external electronic device 210) and share the connection to the Internet 230 through the WiFi network with the external electronic devices (e.g., the first external electronic device 205 or the second external electronic device 210) by the tethering service. Accordingly, the backbone network for the tethering service of the external electronic devices (e.g., the first external electronic device 205 or the second external electronic device 210) may be the WiFi network.

The first external electronic device 205 may include the first application APP#1 and the second application APP#2, and may have a tethering connection 505a to the electronic device 215 through WiFi. The tethering connection 505a may include a connection for the first application and a connection for the second application, and both of the first application and the second application of the first external electronic device 205 may have the WiFi network as their backbone network. Similarly, the second external electronic device 210 may include the first application and the second application and have a tethering connection 510a to the electronic device 215 through WiFi. The tethering connection 510a may include a connection for the first application and a connection for the second application, and both of the first application and the second application of the second external electronic device 210 may have the WiFi network as their backbone network.

According to various embodiments, it may not be preferable to apply the Internet connection through the WiFi AP 525, used by the electronic device 215 commonly to the first application and the second application of each external electronic device (e.g., the first external electronic device 205 or the second external electronic device 210) according to QoS and service requirements and/or user settings of the first application and the second application in each external electronic device (e.g., the first external electronic device 205 or the second external electronic device 210). In various embodiments to be described below, the electronic device 215 may select backbone networks individually for the first application and the second application of each external electronic device (e.g., the first external electronic device 205 or the second external electronic device 210), referring to configuration information for the first application and the second application of the first external electronic device 205 and the second external electronic device 210.

Figure 6:
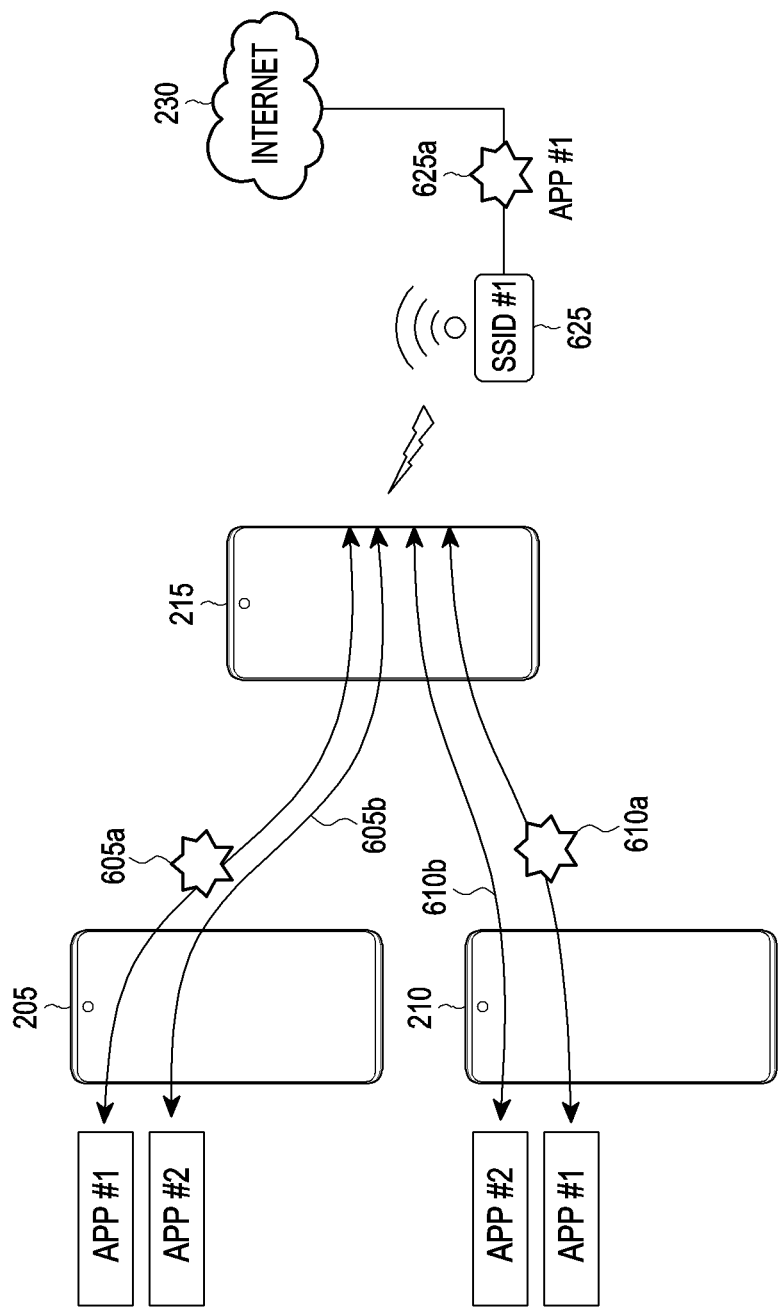
FIG. 6 is a diagram illustrating service restrictions in a WiFi network in an electronic device that provides a tethering service according to an embodiment of the disclosure.

FIG. 6 is a diagram illustrating service restrictions in a WiFi network in an electronic device that provides a tethering service according to an embodiment of the disclosure.

Referring to FIG. 6, the electronic device 215 may access an AP 625 by the WiFi technology and connect to the Internet 230 through a WiFi network including the AP 625. When the tethering service is required, the electronic device 215 may operate as a host device that provides the tethering service to external electronic devices (e.g., the first external electronic device 205 or the second external electronic device 210) and share the connection to the Internet 230 through the WiFi network of the AP 625 with the external electronic devices (e.g., the first external electronic device 205 or the second external electronic device 210) by the tethering service. According to an embodiment, the first external electronic device 205 may include the first application APP#1 and the second application APP#2 and have tethering connections 605a and 605b to the electronic device 215 through WiFi. For example, a first tethering connection 605a may be mapped to the first application, and a second tethering connection 605b may be mapped to the second application. According to an embodiment, the second external electronic device 210 may include the first application and the second application and have tethering connections 610a and 610b to the electronic device 215 through WiFi. For example, a first tethering connection 610a may be mapped to the first application, and a second tethering connection 610b may be mapped to the second application.

In an embodiment, a WiFi connection may not be allowed for the first application executable in each external electronic device (e.g., the first external electronic device 205 or the second external electronic device 210) according to the security of each application or a service restriction for each AP. For example, the first application may be configured such that only an Internet connection through a cellular network is allowed for the first application to enhance security. In an embodiment, although the electronic device 215 attempts an Internet connection for the first application through the AP 625, when the first application is configured for a cellular network only, an Internet connection 625a for the first application may be unavailable in the AP 625. In this case, any one of the external electronic devices 205 or 210 or the electronic device 215 may notify the user that the Internet connection of the first application is unavailable and deactivate communication for the first application. For example, the AP 625 may block the Internet connection of the first application according to security settings, a firewall, and/or proxy settings.

Figure 7:
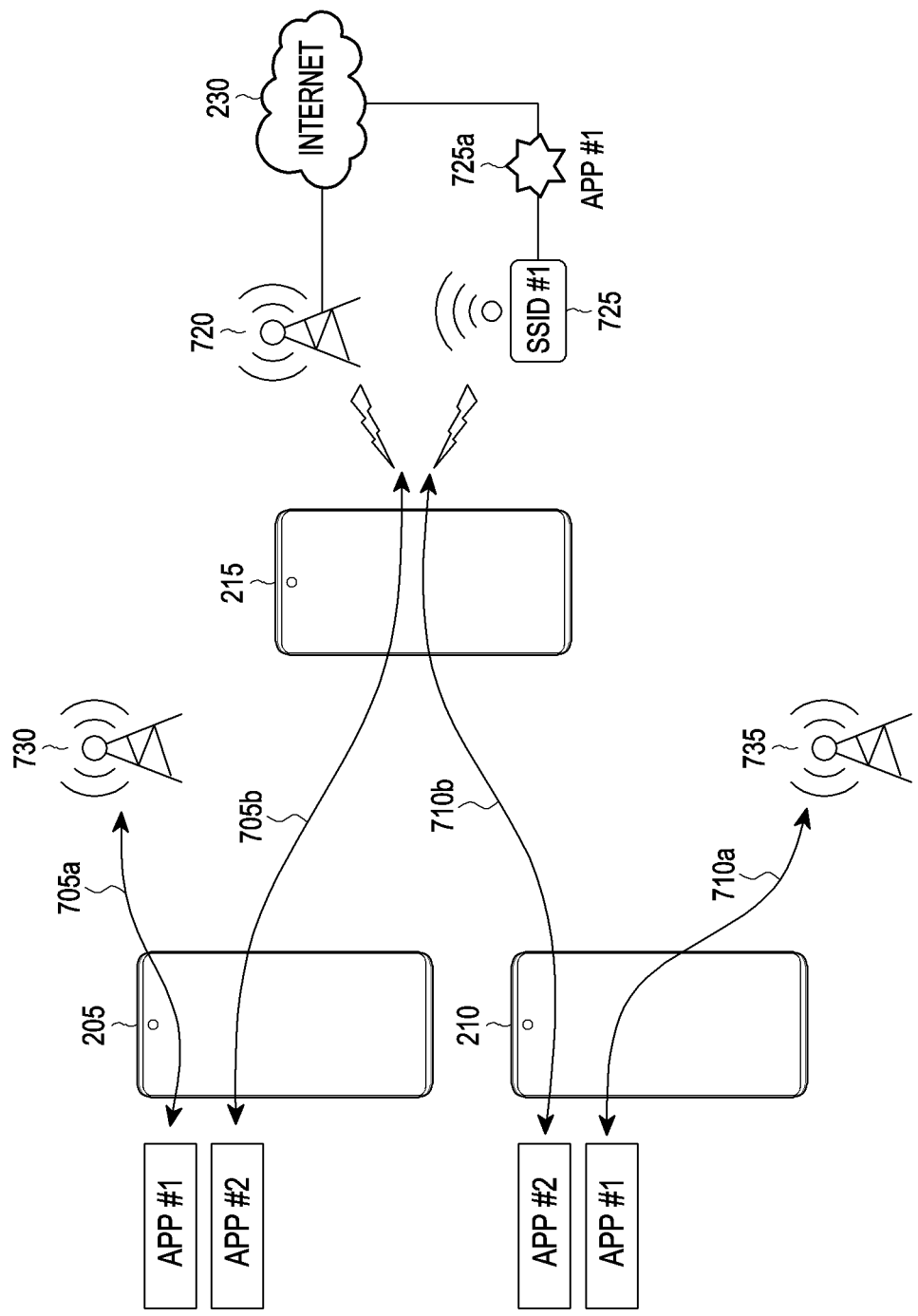
FIG. 7 is a diagram illustrating use of multiple networks in an electronic device that provides a tethering service according to an embodiment of the disclosure.

In embodiments to be described below, when the first external electronic device 205 or the second external electronic device 210 is capable of supporting multiple networks, each external electronic device (e.g., the first external electronic device 205 or the second external electronic device 210) may attempt to directly connect to another network, for example, a cellular network as illustrated in FIG. 7, for the Internet connection of the first application, while maintaining the WiFi connection for the second application running on the tethering connections 605b and 610b to the electronic device 215.

FIG. 7 is a diagram illustrating use of multiple networks in an electronic device that provides a tethering service according to an embodiment of the disclosure.

Referring to FIG. 7, the electronic device 215 may access an AP 725 by the WiFi technology, while connecting to a cellular BS 720 by the cellular RAT. The electronic device 215 may operate as a host device that provides the tethering service to external electronic devices (e.g., the first external electronic device 205 or the second external electronic device 210) and share the connection to the Internet 230 through the WiFi network of the AP 725 with the external electronic devices (e.g., the first external electronic device 205 or the second external electronic device 210) by the tethering service.

The electronic device 215 may provide the tethering service for the second application APP#2 of the external electronic devices (e.g., the first external electronic device 205 or the second external electronic device 210) through a first tethering connection 705b and a second tethering connection 710b. When an Internet connection 725a is not available to the first application APP#1 executed in the external electronic devices (e.g., the first external electronic device 205 or the second external electronic device 210), the external electronic device (e.g., the first external electronic device 205 or the second external electronic device 210) may connect to cellular BSs 730 and 735, respectively, for running the first application, while maintaining the first tethering connection 705b and the second tethering connection 710b for the second application. For example, the first external electronic device 205 may access a first cellular BS 730 to establish a cellular connection 705a and map the cellular connection 705a to its first application. For example, the second external electronic device 210 may access a second cellular BS 735 to establish a cellular connection 710a and map the cellular connection 710a to its first application.

When the external electronic devices (e.g., the first external electronic device 205 or the second external electronic device 210) establishing the cellular connections 705a and 710a with the cellular BSs 730 and 735, while maintaining the tethering connections 705b and 710b of the electronic device 215, this may cause a service delay and/or waste of network resources. Further, in various embodiments to be described later, the electronic device 215 may enable the external electronic devices (e.g., the first external electronic device 205 or the second external electronic device 210) to run a plurality of applications through the tethering service without an additional network connection by individually selecting and connecting backbone networks for the first application and the second application of each external electronic device (e.g., the first external electronic device 205 or the second external electronic device 210), referring to configuration information about the first application and the second application in the first external electronic device 205 and the second external electronic device 210.

Figure 8A:
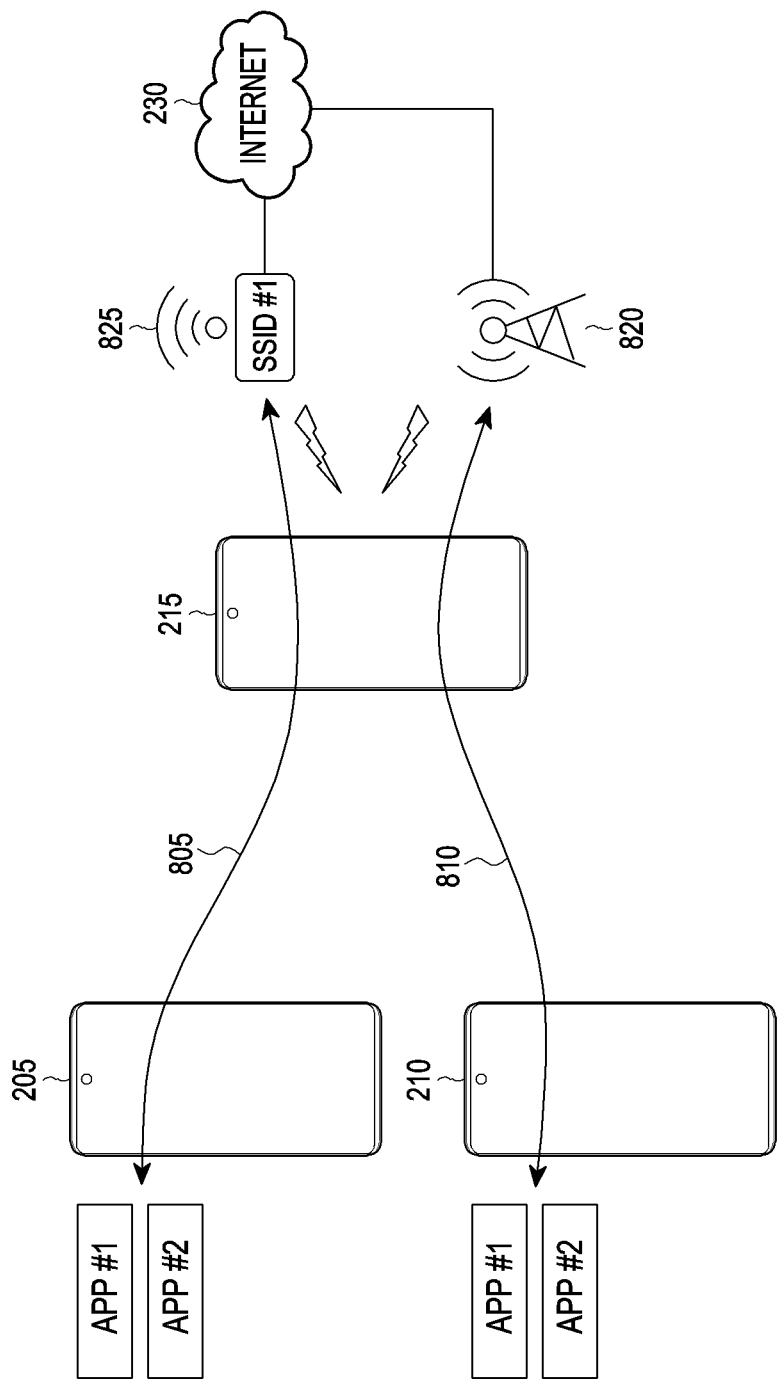
FIGS. 8A and 8B are diagrams illustrating a tethering service of an electronic device connected to a plurality of backbone networks according to various embodiments of the disclosure.
Figure 8B:
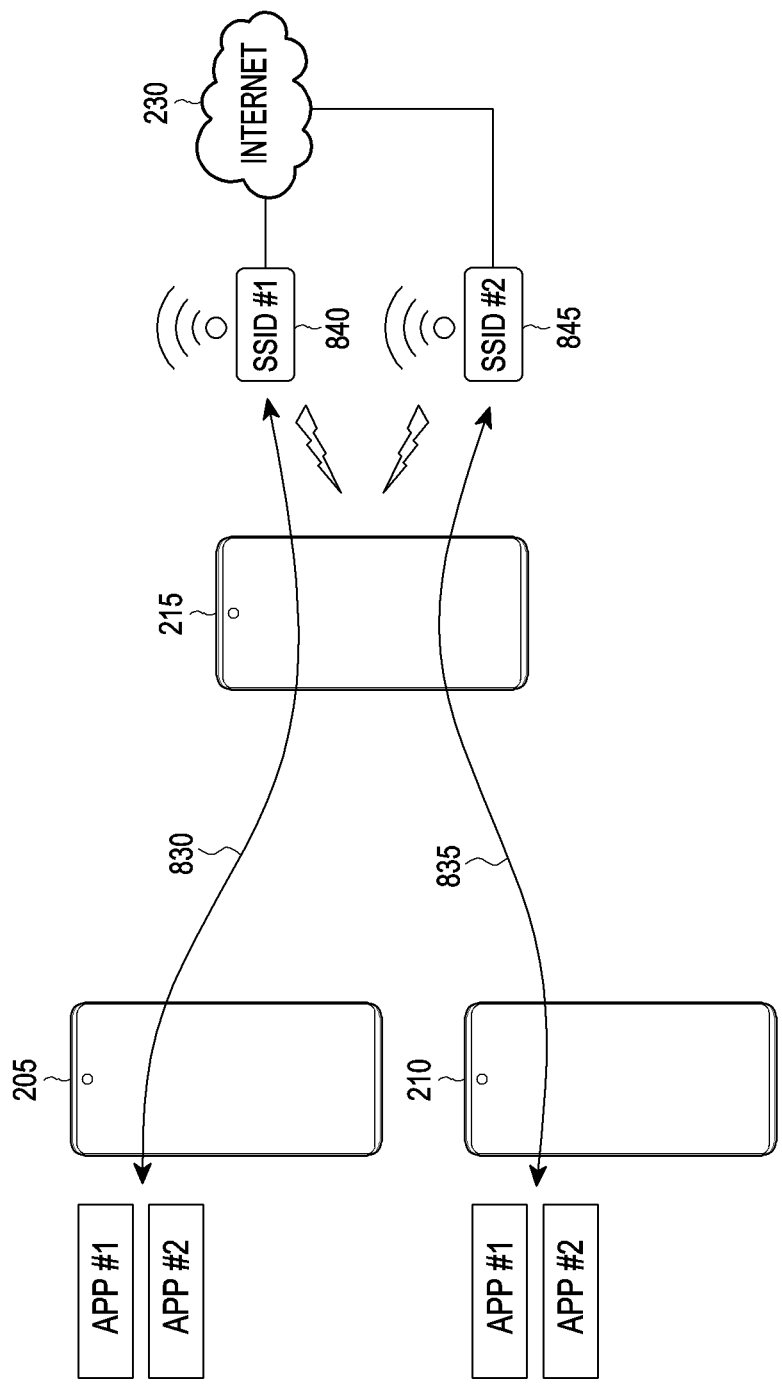

FIGS. 8A and 8B are diagrams illustrating a tethering service of an electronic device connected to a plurality of backbone networks according to various embodiments of the disclosure.

Referring to FIG. 8A, the electronic device 215 may access a cellular BS 820 by using the cellular RAT and connect to the Internet 230 through a cellular network including the cellular BS 820, while connecting to the Internet 230 through a WiFi network including an AP 825 by the WiFi technology. The first external electronic device 205 and the second external electronic device 210 may establish a first tethering connection 805 and a second tethering connection 810 with the electronic device 215, respectively for the tethering service. The first tethering connection 805 may be shared between at least one application executable in the first external electronic device 205, for example, the first application APP#1 and the second application APP#2. Similarly, the second tethering connection 810 may be shared between at least one application executable in the second external electronic device 210, for example, the first application and the second application.

The electronic device 215 may map the first tethering connection 805 to the first external electronic device 205 to the connection to the Internet 230 through the AP 825, and map the second tethering connection 810 to the second external electronic device 210 to the connection to the Internet 230 through the cellular BS 820. Accordingly, the backbone network for the tethering service of the first external electronic device 205 may be the WiFi network, and the backbone network for the tethering service of the second external electronic device 210 may be the cellular network. In an embodiment, the electronic device 215 may independently select a backbone network for each application of each external electronic device (e.g., the first external electronic device 205 or the second external electronic device 210), referring to the QoS, service requirements, and/or user settings of the first application and the second application in the first external electronic device 205 and the second external electronic device 210.

Referring to FIG. 8B, the electronic device 215 may establish a WiFi connection with each of AP#1 840 and AP#2 845 by the WiFi technology and connect to the Internet 230 through AP#1 840 and AP#2 845. The electronic device 215 may simultaneously maintain a first WiFi connection with AP#1 840 and a second WiFi connection with AP#2 845. In an embodiment, the first WiFi connection and the second WiFi connection may be maintained substantially simultaneously in the logical layer, and divided in time resources, frequency resources, and/or code resources in the physical layer.

The first external electronic device 205 may establish a first tethering connection 830 with the electronic device 215, for the tethering service, and the second external electronic device 210 may establish a second tethering connection 835 with the electronic device 215, for the tethering service. The first tethering connection 830 may be shared between at least one application executable in the first external electronic device 205, for example, the first application APP#1 and the second application APP#2. Similarly, the second tethering connection 835 may be shared between at least one application executable in the second external electronic device 210, for example, the first application and the second application.

The electronic device 215 may map the first tethering connection 830 to the first external electronic device 205 to the connection to the Internet 230 through AP#1 840, and map the second tethering connection 835 to the second external electronic device 210 to the connection to the Internet 230 through AP#2 845. Accordingly, the backbone network for the tethering service of the first external electronic device 205 may be a first WiFi network including the AP#1 840, and the backbone network for the tethering service of the second external electronic device 210 may be a second WiFi network including AP#2 845. In an embodiment, the electronic device 215 may independently select a backbone network for each application of each external electronic device (e.g., the first external electronic device 205 or the second external electronic device 210), referring to the QoS, service requirements, and/or user settings of the first application and the second application in the first external electronic device 205 and the second external electronic device 210.

While not shown, in an embodiment, the electronic device 215 may establish cellular connections with different cellular networks each including a different cellular BS and map a first tethering connection to the first external electronic device 205 to a first cellular network of a first cellular BS and a second tethering connection to the second external electronic device 210 to a second cellular network of a second cellular BS. The electronic device 215 may have a plurality of cellular-based backbone networks for the tethering service.

In various embodiments, the electronic device 215 may use at least one of the following pieces of information to select a backbone network for the tethering service.

First, preferred network information may indicate a preferred network type for each of at least one application executable in a client device that may access the electronic device 215 (e.g., the first external electronic device 205 or the second external electronic device 210), for the tethering service. In an embodiment, the network type may be cellular or WiFi. In an embodiment, the network type may mean RTT. In an embodiment, the network type may indicate cellular RAT. In an embodiment, the network type may indicate a cellular network of a different communication operator. For example, for an application ID, the preferred network information may indicate "Cellular/5G only" (5G cellular network only), "Cellular/LTE only" (LTE cellular network only), "WiFi only" (WiFi network only), "Any" (either a cellular network or a WiFi network is available), or "Lowest RTT" (minimum RTT network first).

Secondly, network switching permission information may indicate whether switching to a paid network (e.g., a cellular network) is allowed for each of at least one application executable in the electronic device 215 or a client device that may access the electronic device 215 (e.g., the first external electronic device 205 or the second external electronic device 210), for he tethering service. In an embodiment, when the network switching permission information includes "Y" for APP#1, this may mean that APP#1 prefers a WiFi network, and when the WiFi network is blocked or failed, a cellular network is available. In an embodiment, when the network switching permission information includes "N" for APP#1, it may mean that APP#1 does not allow switching to another network (e.g., a cellular network). In this case, APP#1 may follow a network type according to the preferred network information.

Thirdly, network connection permission information may indicate whether a specified application is blocked for each of at least one AP that the electronic device 215 has ever accessed or is capable of detecting. Each AP may be identified by a service set identifier (SSID) indicating a network name. In an embodiment, when the network connection permission information includes "block: APP#1" for SSID#1, it may mean that an Internet connection through the AP of SSID#1 is not available for APP#1. In an embodiment, when the network connection permission information includes "Any" for SSID#1, it may mean that the AP of SSID#1 allows an Internet connection for all types of applications.

In an embodiment, at least one of the preferred network information or the network switching permission information may be set by the user in the electronic device 215 capable of providing the tethering service and applied to at least one external electronic device that uses the same user account as the electronic device 215 (e.g., the external device (e.g., the first external electronic device 205 or the second external electronic device 210)). In an embodiment, at least one of the preferred network information or the network switching permission information may be set by the user in at least one external electronic device capable of using the tethering service of the electronic device 215 (e.g., the external device (e.g., the first external electronic device 205 or the second external electronic device 210)), and transmitted to the electronic device 215, upon request of the electronic device 215 or autonomously, before, at the start of, or during the tethering service.

In an embodiment, the network connection permission information may be recorded and stored in the electronic device 215, each time the electronic device 215 fails in accessing to an AP (e.g., the AP 825) for communication of an application of at least one external electronic device (e.g., the external electronic device (e.g., the first external electronic device 205 or the second external electronic device 210)). In an embodiment, the electronic device 215 may receive the network connection permission information from the AP (e.g., the AP 825) and sore the received network connection information. In an embodiment, each time an external electronic device (e.g., the external electronic device (e.g., the first external electronic device 205 or the second external electronic device 210)) fails in accessing to an AP (e.g., the AP 825) for communication of an application, through the tethering service or directly, the external electronic device (e.g., the external electronic device (e.g., the first external electronic device 205 or the second external electronic device 210)) may record and store the network connection permission information. In an embodiment, the external electronic device (e.g., the external electronic device (e.g., the first external electronic device 205 or the second external electronic device 210)) may transmit the network connection permission information to the electronic device 215, upon request of the electronic device 215 or autonomously, before, at the start of, or during the tethering service.

In an embodiment, the electronic device 215 may select a backbone network for each application of an external electronic device using the tethering service (e.g., the external electronic device (e.g., the first external electronic device 205 or the second external electronic device 210) based on QoS information about the application. In an embodiment, the first application may require a normal level of QoS, such as a web browser, and the second application may require a high level of QoS, such as a video chat application in which real-time streaming is important. While the second application is running, a backbone network for each application may be selected as follows.

In an embodiment, the electronic device 215 may identify a WiFi multimedia (WMM) value required for an application from a QoS field included in a packet received from the application of the external electronic device (e.g., the first external electronic device 205 or the second external electronic device 210). The WMM value may specify an access category (AC) of an application as one of four categories, voice, video, best effort, and background. The electronic device 215 may select a backbone network having a low delay according to the WMM value of the application. In an embodiment, the electronic device 215 may uniquely identify an application of the external electronic device (e.g., the first external electronic device 205 or the second external electronic device 210) by a unique user ID (UID) specified for the application and obtain QoS information from an information element (IE) included in a data packet received from the application. In an embodiment, the electronic device 215 may obtain QoS information from an IE included in a transmission control protocol (TCP) sync packet or a user datagram packet (UDP) request packet received from an application of the external electronic device (e.g., the first external electronic device 205 or the second external electronic device 210).

In an embodiment, the external electronic device (e.g., the first external electronic device 205 or the second external electronic device 210) may identify the access priority of the QoS of each application and transmit QoS information about a service of the application to the electronic device, when generating a TCP/UDP port based on the UCI of the application. The electronic device 215 may enable the external electronic device (e.g., the first external electronic device 205 or the second external electronic device 210) to use an appropriate network service matching a QoS requested by the external electronic device by interpreting an IP address of the external electronic device (e.g., the first external electronic device 205 or the second external electronic device 210) and a destination IP requested by the application by a network address translation (NAT) function, and routing a packet of the application to a backbone network selected for the application.

Figure 9:
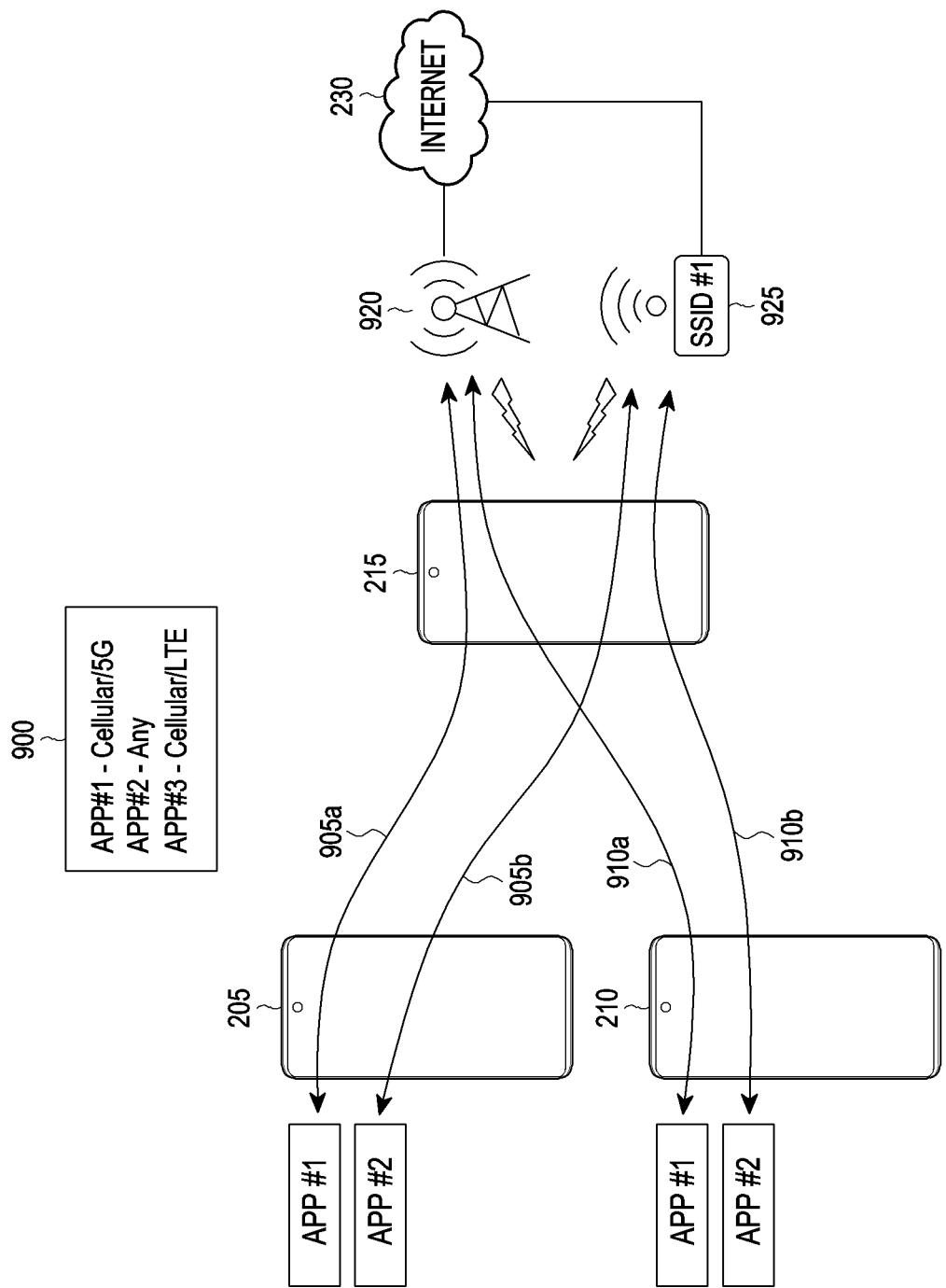
FIG. 9 is a diagram illustrating a connection to a backbone network based on preferred network information according to an embodiment of the disclosure.

FIG. 9 is a diagram illustrating or a connection to a backbone network based on preferred network information according to an embodiment of the disclosure.

Referring to FIG. 9, the electronic device 215 may access a cellular BS 920 by the cellular RAT and connect to the Internet 230 through a cellular network including the cellular BS 920. Alternatively, the electronic device 215 may connect to the Internet 230 via a WiFi network including an AP 925 by the WiFi technology. While not shown, the electronic device 215 may simultaneously connect to different cellular BSs based on different cellular RATs, different cellular BSs of different communication operators, and/or different WiFi networks including different APs, and the network type of each backbone network is not limited to the illustrated example.

The first external electronic device 205 may establish a first tethering connection 905a and a second tethering connection 905b with the electronic device 215, for the tethering service. The first tethering connection 905a is related to the first application APP#1 of the first external electronic device 205, and the electronic device 215 may map the first tethering connection 905a to the cellular network of the cellular BS 920. Then, the first application may access the Internet 230 through the cellular network. The second tethering connection 905b is related to the second application APP#2 of the first external electronic device 205, and the electronic device 215 may map the second tethering connection 905b to the WiFi network of the AP 925. Then, the second application may access the Internet 230 through the WiFi network.

The second external electronic device 210 may establish a third tethering connection 910a and a fourth tethering connection 910b with the electronic device 215, for the tethering service. The third tethering connection 910a is related to the first application APP#1 of the second external electronic device 210, and the electronic device 215 may map the third tethering connection 910a to the cellular network of the cellular BS 920. Then, the first application may access the Internet 230 through the cellular network. The fourth tethering connection 910b is related to the second application APP#2 of the second external electronic device 210, and the electronic device 215 may map the fourth tethering connection 910b to the WiFi network of the AP 925. Then, the second application may access the Internet 230 through the WiFi network.

The electronic device 215 may identify preferred network information 900 for the first application and the second application executable in the first external electronic device 205 and the second external electronic device 210. In an embodiment, the preferred network information 900 may be configured by a user and/or a manufacturer in the electronic device 215 or may be configured by a user and/or a manufacturer in the first external electronic device 205 and/or the second external electronic device 210 and transmitted to the electronic device 215. In another embodiment, the electronic device 215 may receive the preferred network information 900 from an external device (e.g., the server 108). In an embodiment, the preferred network information 900 may specify "Cellular/5G" for the first application, "Any" for the second application, and "Cellular/LTE" for a third application. The electronic device 215 may map a first tethering connection 905a and a third tethering connection 910a related to the first application based on the preferred network information 900 to the cellular BS 920 by cellular/5G technology. Since the second application is specified as "Any", the electronic device 215 may map a second tethering connection 905b and a fourth tethering connection 910b related to the second application to the WiFi network of the AP 925 for which no charge is made. As described above, the electronic device 215 may dynamically operate multiple networks including the cellular network and the WiFi network as backbone networks for the tethering service of the first external electronic device 205 and the second external electronic device 210.

Figure 10:
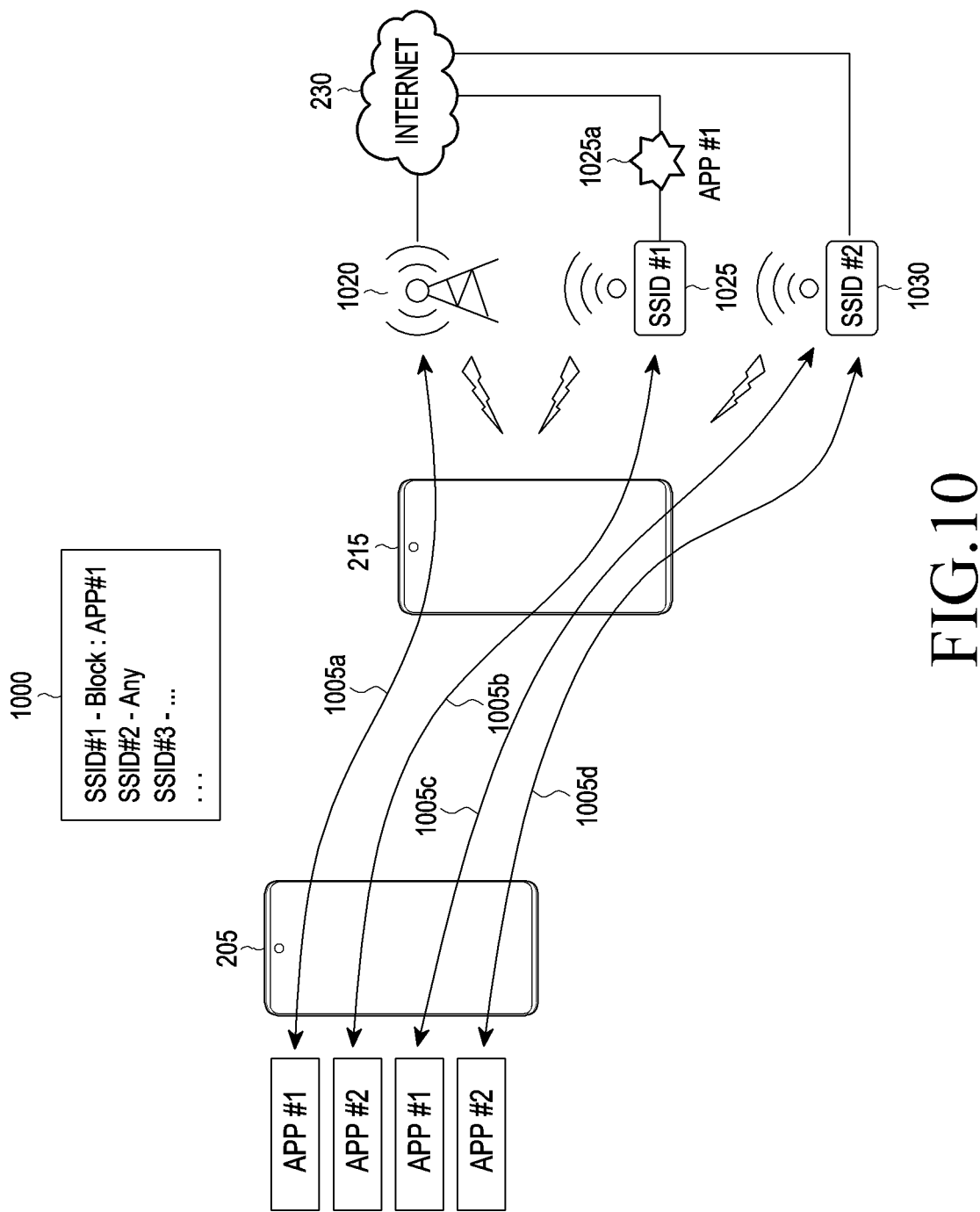
FIG. 10 is a diagram illustrating a connection to a backbone network based on network connection permission information according to an embodiment of the disclosure.

FIG. 10 is a diagram illustrating a connection to a backbone network based on network connection permission information according to an embodiment of the disclosure.

Referring to FIG. 10, the electronic device 215 may access a cellular BS 1020 by the cellular RAT and connect to the Internet 230 through a cellular network including the cellular BS 1020, or may connected to the Internet 230 through a WiFi network including AP#1 1025 and/or AP#2 1030 by the WiFi technology. While not shown, the cellular BS 1020 may be replaced with another AP, or at least one of AP#1 1025 and/or AP#2 1030 may be replaced with another cellular BS.

The first external electronic device 205 may establish a first tethering connection 1005a and a second tethering connection 1005b with the electronic device 215, for the tethering service. The first tethering connection 1005a is related to the first application APP#1 of the first external electronic device 205, and the second tethering connection 1005b is related to the second application APP#2 of the first external electronic device 205.

The electronic device 215 may obtain network connection permission information 1000 for at least one AP to which the electronic device 215 has ever accessed and at least one AP detectable by the electronic device 215. In an embodiment, the network connection permission information 1000 may be collected and recorded through an AP access history by the electronic device 215, or may be collected and recorded by the first external electronic device 205 and/or the second external electronic device 210 and transmitted to the electronic device 215. In an embodiment, the network connection permission information 1000 may be provided to the electronic device 215 from at least one AP. In another embodiment, the electronic device 215 may receive the network connection permission information 1000 from an external device (e.g., the server 108). In an embodiment, the network connection permission information 1000 may specify "block: APP#1" for AP#1 1025 having SSID#1 and "Any" for AP#2 1030 having SSID#2. The electronic device 215 may identify that the first tethering connection 1005a related to the first application is not available in AP#1 1025 based on the network connection permission information 1000, as indicated by reference numeral 1025a.

In an embodiment, based on the identification result, the electronic device 215 may map the first tethering connection 1005a for the first application to the cellular network of the cellular BS 1020, and the second tethering connection 1005b for the second application to the WiFi network of AP#1 1025. In an embodiment, based on the identification result, the electronic device 215 may search for another AP capable of allowing the first application, for example, AP#2 1030 instead of AP#1 1025 and connect the detected AP#2 1030, and may map both of the third tethering connection 1005c for the first application and the fourth tethering connection 1005d for the second application to the WiFi network of AP#2 1030. The third tethering connection 1005c and the fourth tethering connection 1005d may substitute for the first tethering connection 1005a and the second tethering connection 1005b, or supplement the first tethering connection 1005a and the second tethering connection 1005b.

Figure 11:
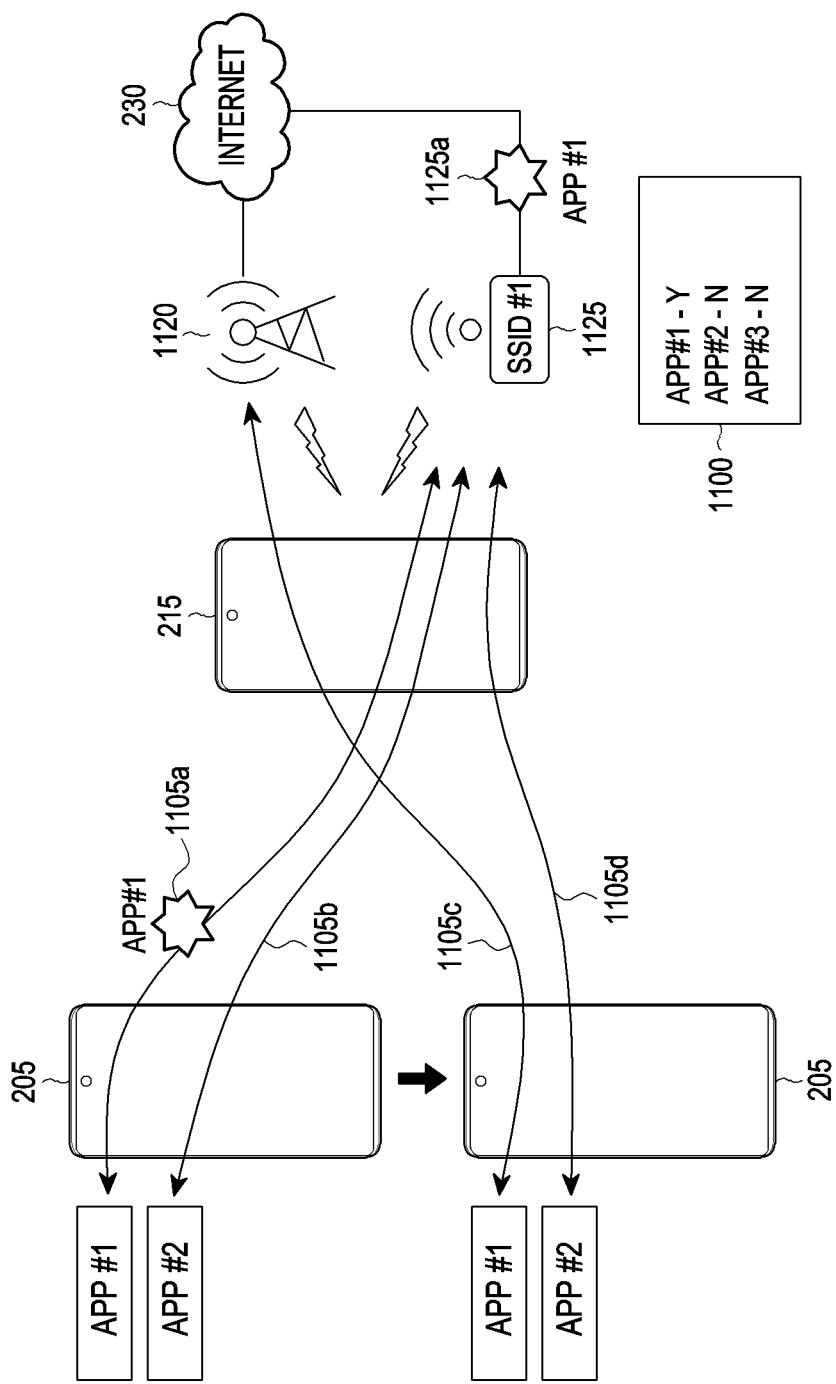
FIG. 11 is a diagram illustrating use of multiple networks after service restriction detection according to an embodiment of the disclosure.

FIG. 11 is a diagram illustrating use of multiple networks after service restriction detection according to an embodiment of the disclosure.

Referring to FIG. 11, the first external electronic device 205 may establish a first tethering connection 1105a and a second tethering connection 1105b with the electronic device 215, for the tethering service. For example, the first tethering connection 1105a may be related to the first application APP#1 of the first external electronic device 205, and the second tethering connection 1105b may be related to the second application APP#2 of the first external electronic device 205.

The electronic device 215 may attempt to access an AP 1125 to support the first tethering connection 1105a and the second tethering connection 1105b of the first external electronic device 205. The AP 1125 may determine to block the first tethering connection 1105a related to the first application for some reason, for example, at least one of a security setting, a firewall, or proxy service blocking. The electronic device 215 may receive a notification indicating that an Internet connection 1125a of the first application is unavailable from the AP 1125 and transmit a user query for multi-network activation to the first external electronic device 205.

In an embodiment, upon receipt of the user inquiry from the electronic device 215, the first external electronic device 205 may display a screen inquiring about whether the user intends to accept a connection to a cellular network involving charging for the first application. In an embodiment, the first external electronic device 205 may display a screen inquiring the user about whether to agree to multi-network support. Upon detection of an input for accepting a connection to the cellular network or agreeing to support multiple networks from the user, the first external electronic device 205 may transmit a signal indicating that the connection to the cellular network has been accepted for the first application to the electronic device 215. The electronic device 215 may map the third tethering connection 1105c for the first application to the cellular network including the cellular BS 1120 in response to the reception of the signal. On the other hand, the fourth tethering connection 1105d for the second application may be mapped to the WiFi network of the AP 1125. In an embodiment, the third tethering connection 1105c may substitute for the first tethering connection 1105a, and the fourth tethering connection 1105d may substitute for or supplement the second tethering connection 1105b.

In an embodiment, the electronic device 215 may receive a notification indicating that the Internet connection of the first application is unavailable from the AP 1125, and determine whether the first application may connect to the cellular network according to pre-stored network switching permission information 1100. When the network switching permission information 1100 indicates that the cellular network may be used for the first application ("Y"), the electronic device 215 may then map the third tethering connection 1105c for the first application to the cellular network including the cellular BS 1120. Although not shown, in an embodiment, the electronic device 215 may map the third tethering connection 1105c for the first application to the WiFi network of another AP. The fourth tethering connection 1105d for the second application may be mapped to the WiFi network of the AP 1125. In an embodiment, the third tethering connection 1105c may substitute for the first tethering connection 1105a, and the fourth tethering connection 1105d may substitute for or supplement the second tethering connection 1105b.

Figure 12:
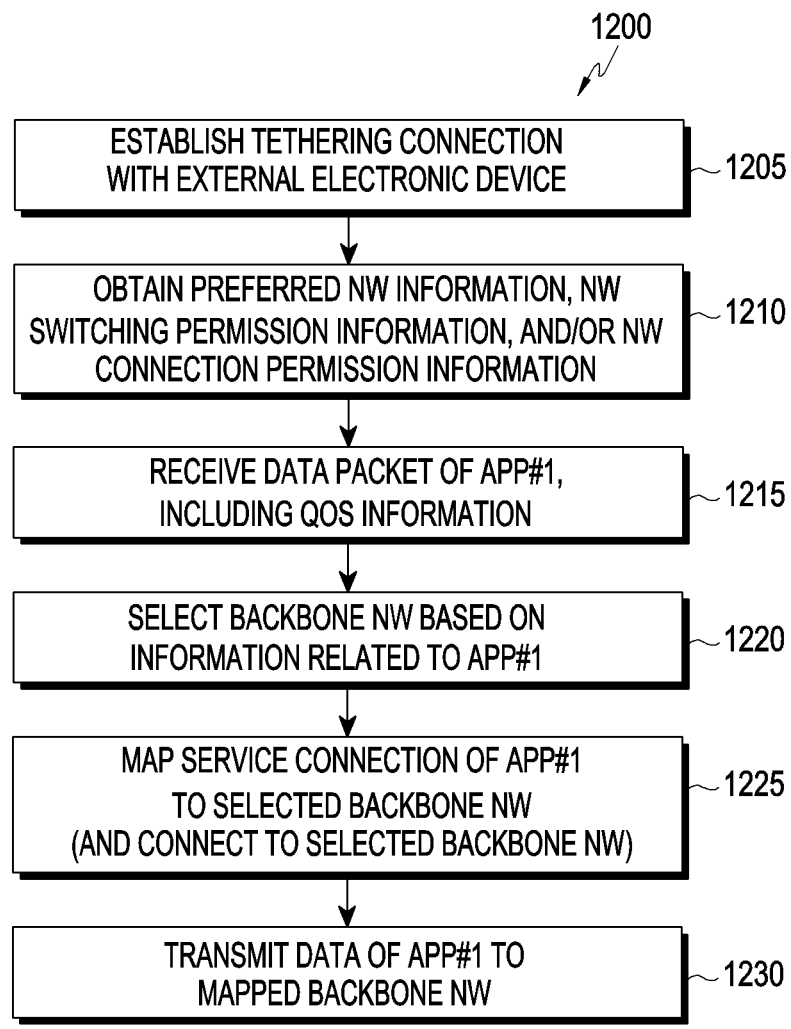
FIG. 12 is a flowchart illustrating an operation of an electronic device that provides a tethering service according to an embodiment of the disclosure.

FIG. 12 is a flowchart 1200 illustrating an operation of an electronic device that provides a tethering service according to an embodiment of the disclosure. The operations of the illustrated flowchart may be executed by the processor 120 included in the electronic device 101 of FIG. 1, by way of example. The electronic device 101 may be a host device (e.g., the electronic device 215) capable of providing the tethering service.

Referring to FIG. 12, in operation 1205, the processor 120 may establish a tethering connection with an external electronic device (e.g., the first external electronic device 205 or the second external electronic device 210) through the communication module 190, for the tethering service. The tethering connection may be established, for example, based on the WiFi technology.

In operation 1210, the processor 120 may obtain, for example, at least one of preferred network information, network switching permission information, and/or network connection permission information, as information used to select a backbone network for the tethering service of an external electronic device. The at least one piece of information used to select a backbone network may be identified from the memory 130 of the electronic device 101, input from a user, or received from a server or an external electronic device.

In operation 1215, the processor 120 may receive a data packet related to an application having an application ID of APP#1 from the external electronic device through the tethering connection. In an embodiment, the data packet may include QoS information required for the application. In operation 1220, the processor 120 may select a backbone network to which the tethering connection of the application is to be mapped, for example, based on at least one of the preferred network information, the network switching permission information, or the network connection permission information, and the QoS information. In an embodiment, the backbone network may include at least one of a cellular network and a WiFi network. In an embodiment, the backbone network may include a cellular network using a specified cellular RAT. In an embodiment, the backbone network may include a cellular network or a WiFi network operated by a specified communication operator. In an embodiment, the backbone network may include a WiFi network including an AP having a specified SSID.

In an embodiment, in operation 1220, the processor 120 may select a backbone network based on information related to APP#1. For example, the processor 120 may determine whether a QoS indicated by the QoS information is supported by the network to which the electronic device 101 is currently connected, and if not supported, ask the user whether to use another backbone network for a tethering connection of another application. In an embodiment, the processor 120 may output a message inquiring about whether the user agrees to use the cellular network for the application of the external electronic device, through the display (e.g., the display module 160) of the external electronic device or the electronic device 101. When a user input indicates consent, another backbone network (e.g., the cellular network or the WiFi network) may be selected for the tethering service of the application.

In an embodiment, in operation 1220, the processor 120 may determine whether the specified application is for a cellular network only based on the at least one piece of information (e.g., the preferred network information). If not, the processor 120 may determine whether the cellular network is available for the specified application based on the at least one piece of information (e.g., the network switching permission information). When the cellular network is not available for the specified application, the processor 120 may search for a WiFi network suitable for the QoS information, and select the detected WiFi network as a backbone network for the specified application.

In operation 1225, the processor 120 may map the service connection of APP#1 to the selected backbone network and, if necessary, perform a connection procedure with the selected backbone network. For example, the tethering connection corresponding to the application may be mapped to the selected backbone network. The processor 120 may store mapping information indicating that the tethering connection is mapped to the selected backbone network. Mapping the tethering connection to the selected backbone network may mean that packets received from an external electronic device through the tethering connection are transferred to the Internet through the selected backbone network by the processor 120. Further, mapping the tethered connection to the selected backbone network may mean that packets having the application corresponding to the tethered connection as a destination are received by the electronic device 101 through the selected backbone network, and are transmitted to the external electronic device through the tethering connection by the processor 120.

In an embodiment, when a connection to the selected backbone network does not exist, the processor 120 may perform a connection procedure for establishing a connection with the selected backbone network. For example, when the selected backbone network is a WiFi network, and the electronic device 101 is not connected to the WiFi network or needs to be additionally connected to another WiFi network (e.g., a WiFi network of an AP different from the AP to which the electronic device 101 is currently connected), the processor 120 may scan neighboring APs and perform a procedure of connecting to an AP detected as a result of the scanning. For example, when the selected backbone network is a cellular network and the electronic device 101 is not connected to the cellular network or needs to be additionally connected to another cellular network (e.g., a cellular network using an RAT different from the cellular network to which the electronic device 101 is currently connected or a cellular network of a different communication operator different from the cellular network to which the electronic device 101 is currently connected), the processor 120 may perform a procedure of detecting and connecting to a BS of the corresponding cellular network.

In operation 1230, the processor 120 may communicate data of the application APP#1 through the mapped backbone network. In an embodiment, packets received from an external electronic device through the tethering connection may be transmitted to the Internet through the mapped backbone network by the processor 120. When packets having the application corresponding to the tethering connection as a destination are received by the electronic device 101 through the mapped backbone network, the processor 120 may transmit the received packets to the external electronic device through the tethering connection.

Now, a description will be given below of operations of selecting a backbone network for a tethering service according to various embodiments.

Figure 13:
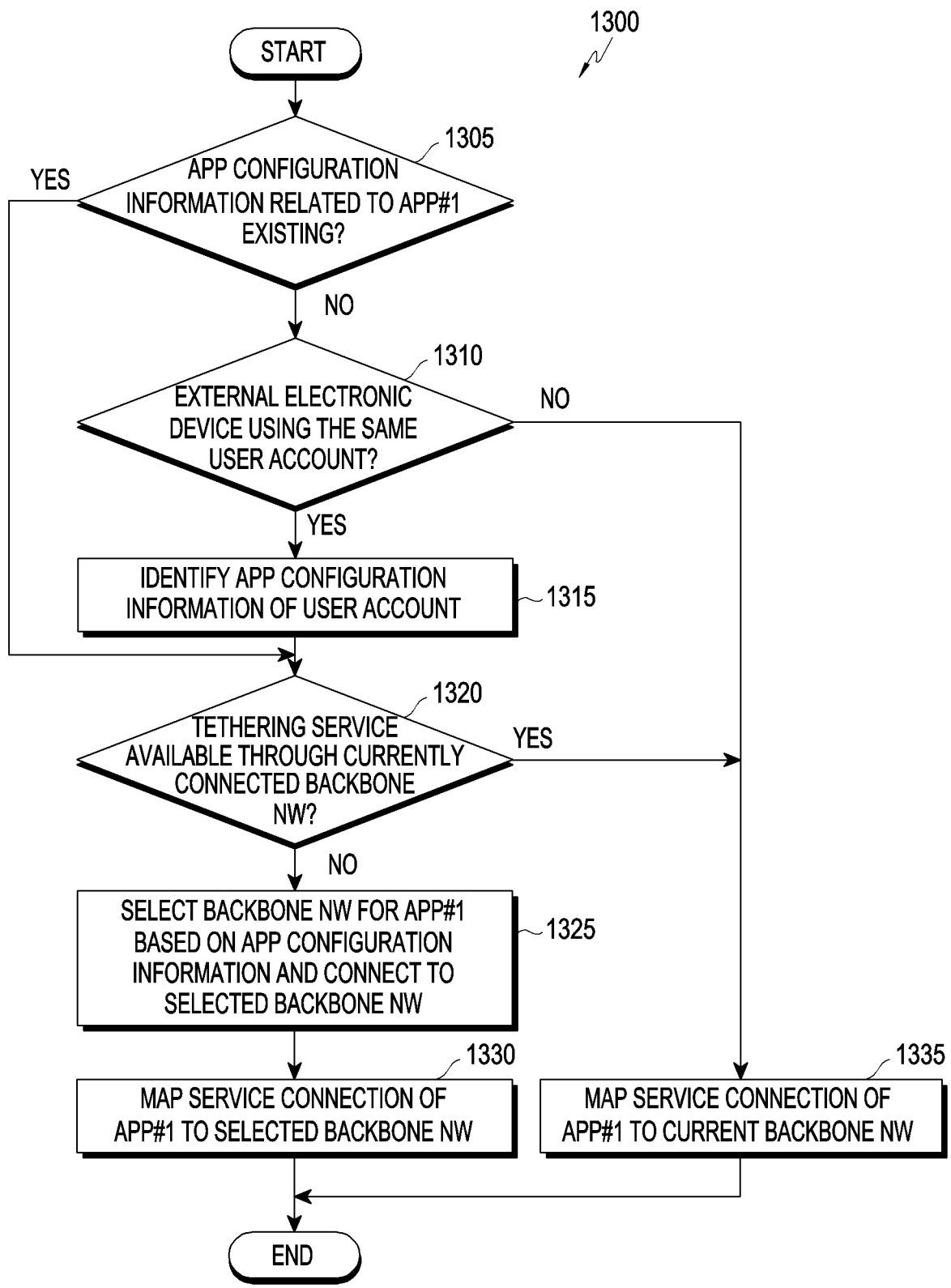
FIG. 13 is a flowchart illustrating an operation of selecting a backbone network for a tethering service according to an embodiment of the disclosure.

FIG. 13 is a flowchart 1300 illustrating an operation of selecting a backbone network for a tethering service according to an embodiment of the disclosure. Operations of the flowchart 1300 illustrated as an embodiment may substitute for operations 1220 and 1225 of FIG. 12.

Referring to FIG. 13, in operation 1305, the processor 120 may determine whether configuration information related to an Internet connection of an application executed in an external electronic device (e.g., the first external electronic device 205 or the second external electronic device 210) is stored in the electronic device 101 (e.g., the electronic device 215) that provides the tethering service, to select a backbone network to service the application. In an embodiment, the configuration information may include at least one of the above-described preferred network information or network switching permission information. In an embodiment, the configuration information may be received from the external electronic device before, at the start, or during the tethering service. In an embodiment, the configuration information may be set by the user in the electronic device 101. In the presence of the configuration information in the electronic device 101, operation 1320 may be performed.

When it is determined in operation 1305 that the configuration information does not exist in the electronic device 101, the processor 120 may determine whether the external electronic device uses the same user account as the electronic device 101 in operation 1310. When the external electronic device does not use the same user account as the electronic device 101, the processor 120 may not identify an Internet setting for the application of the external electronic device. Therefore, the processor 120 may proceed to operation 1335, in which the processor 120 may map a tethering connection related to the application to a backbone network to which the electronic device 101 is currently connected. For example, when the electronic device 101 is currently connected to a WiFi network, the tethering connection related to the application may be mapped to the WiFi network, and the WiFi network may be a backbone network for the tethering connection.

On the contrary, when the external electronic device uses the same user account as the electronic device 101, operation 1315 may be performed. In operation 1315, the processor 120 may identify the configuration information about the application from configuration information related to the Internet connection set for the user account of the electronic device 101. As described above, for the same user account, configuration information set for the electronic device 101 may be applied to the external electronic device. In an embodiment, in operation 1310, the processor 120 may determine whether the external electronic device has a user account associated with the user account of the electronic device 101. For example, when the user account of the external electronic device is dependent on the user account of the electronic device 101, the processor 120 may determine to apply the configuration information set for the electronic device 101 to the external electronic device. For example, the user account of the external electronic device may belong to the same user group (e.g., a family group) as the user account of the electronic device 101.

In operation 1320, the processor 120 may determine whether the tethering service of the application may be provided by using the backbone network to which the electronic device 101 is currently connected, based on the configuration information. In an embodiment, when the electronic device 101 is currently connected to a cellular network, the processor 120 may determine that the tethering service through the cellular network is not available, based on a user setting related to the tethering service, for example. For example, a user who wants to prevent excessive billing may set blocking of the tethering service through the cellular network in the electronic device 101. In an embodiment, when the electronic device 101 is currently connected to a WiFi network, the processor 120 may determine whether the preferred network information included in the configuration information indicates that a WiFi connection is available for the application. When the preferred network information indicates that the application is for a cellular network only, the processor 120 may determine that a WiFi connection is not available for the application. In an embodiment, the processor 120 may determine whether a QoS indicated by QoS information related to the application, received from the external electronic device is supported in the current backbone network, based on the QoS information. When the current backbone network may provide the tethering service of the application, the processor 120 may map the tethering connection related to the application to the backbone network to which the electronic device 101 is currently connected in operation 1335. On the contrary, when the current backbone network may not provide the tethering service of the application, operation 1325 may be performed.

In operation 1325, the processor 120 may select a backbone network for the application of APP#1 being executed in the external electronic device based on the configuration information, and establish a connection with the selected backbone network. In an embodiment, when the electronic device 101 is currently connected to a WiFi network and the preferred network information in the configuration information indicates that the application is for a cellular network only, the processor 120 may select a cellular network. In an embodiment, the processor 120 may additionally establish a connection with a new backbone network by supporting multiple networks while maintaining the connection to the current backbone network for data communication of the electronic device 101. In an embodiment, when the tethering service may not be provided in the cellular network to which the electronic device 101 is currently connected, and the preferred network information in the configuration information indicates 'Any' for the application, the processor 120 may detect and select a WiFi network of any AP. In an embodiment, when it is impossible for the electronic device 101 to provide the tethering service in the cellular network to which the electronic device 101 is currently connected, the preferred network information in the setting information indicates 'Any' for the application, and the electronic device 101 identifies that the application is blocked in the WiFi network of the AP to which the electronic device 101 is currently connected, based on the network connection permission information, the processor 120 may detect and select a WiFi network of an AP other than the specific AP.

In operation 1330, the processor 120 may map the tethering connection of the application to the selected backbone network.

Figure 14:
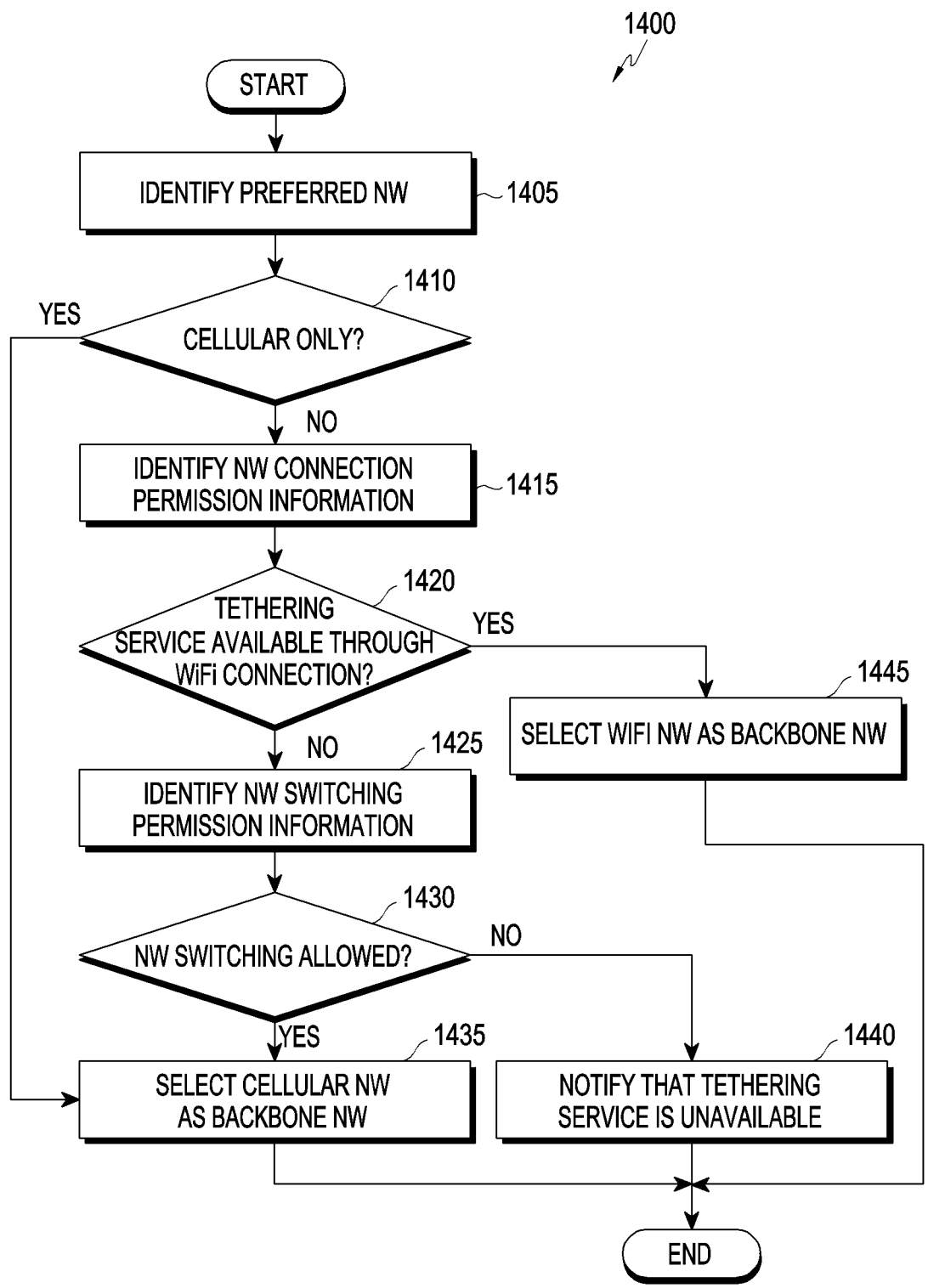
FIG. 14 is a flowchart illustrating an operation of selecting a backbone network for a tethering service according to an embodiment of the disclosure.

FIG. 14 is a flowchart 1400 illustrating an operation of selecting a backbone network for a tethering service according to an embodiment of the disclosure. Operations of the flowchart 1400 shown as an embodiment may substitute for operation 1220 of FIG. 12.

Referring to FIG. 14, in operation 1405, the processor 120 may identify preferred network information related to an application executed in an external electronic device (e.g., the first external electronic device 205 or the electronic device 215) that accesses the electronic device 101 (e.g., the electronic device 215), for a tethering service.

FIG. 15 illustrates an example of preferred network information 1500 that may be used in operation 1405 according to an embodiment of the disclosure.

Figure 17:
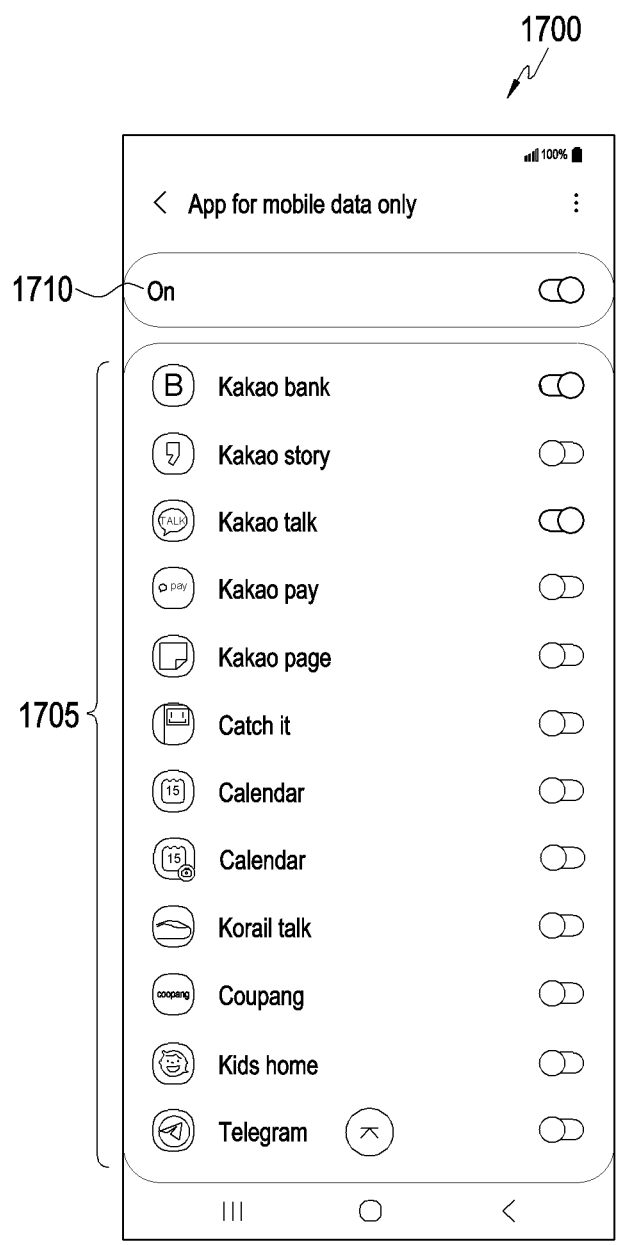
FIGS. 17 and 18 are diagrams illustrating setting menus of setting information used to select a backbone network for a tethering service according to various embodiments of the disclosure.

Referring to FIG. 15, the preferred network information 1500 may include application IDs of a plurality of applications executable in the external electronic device. For example, APP#1 may be specified as "Cellular/5G only", APP#2 may be specified as "Any", APP#3 may be specified as "Cellular/LTE only", APP#4 may be specified as "Lowest RTT" designated, and/or APP#5 may be specified as "Any". In an embodiment, the preferred network information 1500 may be configured through a setting menu 1700 as illustrated in FIG. 17. A detailed description of FIG. 17 will be given later.

In operation 1410, the processor 120 may determine whether the preferred network information indicates that the application is for a cellular network only. When the preferred network information indicates that the application is for a cellular network only, the procedure goes to operation 1435, in which a cellular network may be selected as a backbone network for the tethering service of the application. In an embodiment, when the preferred network information does not indicate that the application is for a cellular network only, operation 1415 may be performed. In an embodiment, when the preferred network information does not indicate that the application is for a cellular network only, the processor 120 may skip operations 1415 and 1420 and proceed to operation 1430 or 1445. When the preferred network information does not indicate that the application is for a cellular network only, and the current backbone network of the electronic device 101 is a cellular network, the processor 120 may skip operations 1415 and 1420 and proceed to operation 1435. In another example, when the preferred network information does not indicate that the application is for a cellular network only, and the current backbone network of the electronic device 101 is a WiFi network, the processor 120 may skip operations 1415 and 1420 and proceed to operation 1445.

In operation 1415, the processor 120 may identify network connection permission information related to the application.

Figure 19:
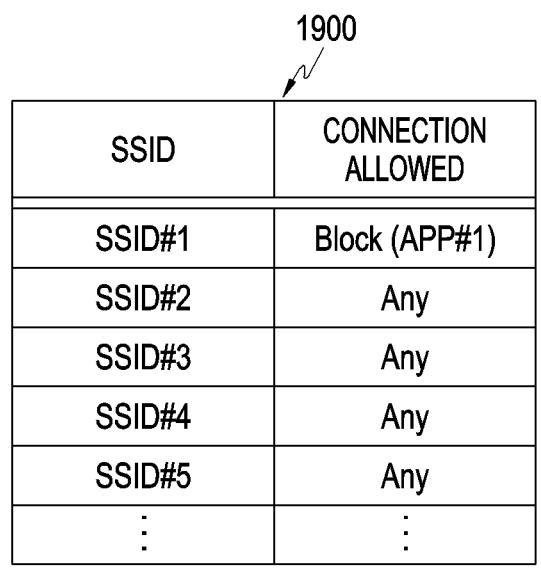
FIG. 19 is a diagram illustrating an example of network connection permission information according to an embodiment of the disclosure.

FIG. 19 illustrates an example of network connection permission information 1900 that may be used in operation 1415 according to an embodiment of the disclosure.

Referring to FIG. 19, the network connection permission information 1900 may include the SSIDs of a plurality of APs to which the electronic device 101 has accessed or is accessing. According to an embodiment, the electronic device 101 may receive the network connection permission information 1900 from an external device (e.g., the server 108). For example, SSID#1 may be specified as "Block: APP#1" (the application of APP#1 is blocked by the AP of SSID#1), and SSIDs #2, 3, 4, 5 may be specified as "Any" (accessible to all applications).

In operation 1420, the processor 120 may determine whether the tethering service is available for the application through a current WiFi connection of the electronic device 101 based on the network connection permission information. When it is determined that a service connection of the application is allowed for the AP of the WiFi network to which the electronic device 101 is currently connected, the procedure proceeds to operation 1445 for the tethering service of the application, and the WiFi network is used as a backbone for the tethering service of the application. In an embodiment, the processor 120 may determine whether any WiFi connection is available for the tethering service of the application in operation 1420, and when available, detect and connect to an appropriate WiFi network for the application in operation 1445. In an embodiment, in operation 1445, the processor 120 may receive QoS information related to the application from the external electronic device, searches for an AP supporting a QoS indicated by the QoS information, and upon detection of the AP supporting the QoS, connect to the AP supporting the QoS.

On the contrary, when the network connection permission information indicates that the AP of the WiFi network to which the electronic device 101 is currently connected does not allow the service connection of the application, the processor 120 may determine that the tethering service is not available for the application through the current WiFi connection, and proceed to operation 1425. In an embodiment, when the tethering service is not available for the application through the current WiFi connection, the processor 120 may skip operations 1425 and 1430 and proceed to operation 1435. In an embodiment, when determining that the tethering service is not available for the application through the current WiFi connection in operation 1420, the processor 120 may detect another AP capable of providing the tethering service for the application and select the WiFi network of the detected AP as a backbone network for the tethering service of the application. In an embodiment, the processor 120 may search for another AP capable of supporting a QoS indicated by QoS information about the application, based on the QoS information.

In operation 1425, the processor 120 may identify network switching permission information related to the application.

FIG. 16 illustrates an example of network switching permission information 1600 that may be used in operation 1405 according to an embodiment of the disclosure.

Referring to FIG. 16, the network switching permission information 1600 includes application IDs of a plurality of applications executable in the external electronic device

Figure 18:
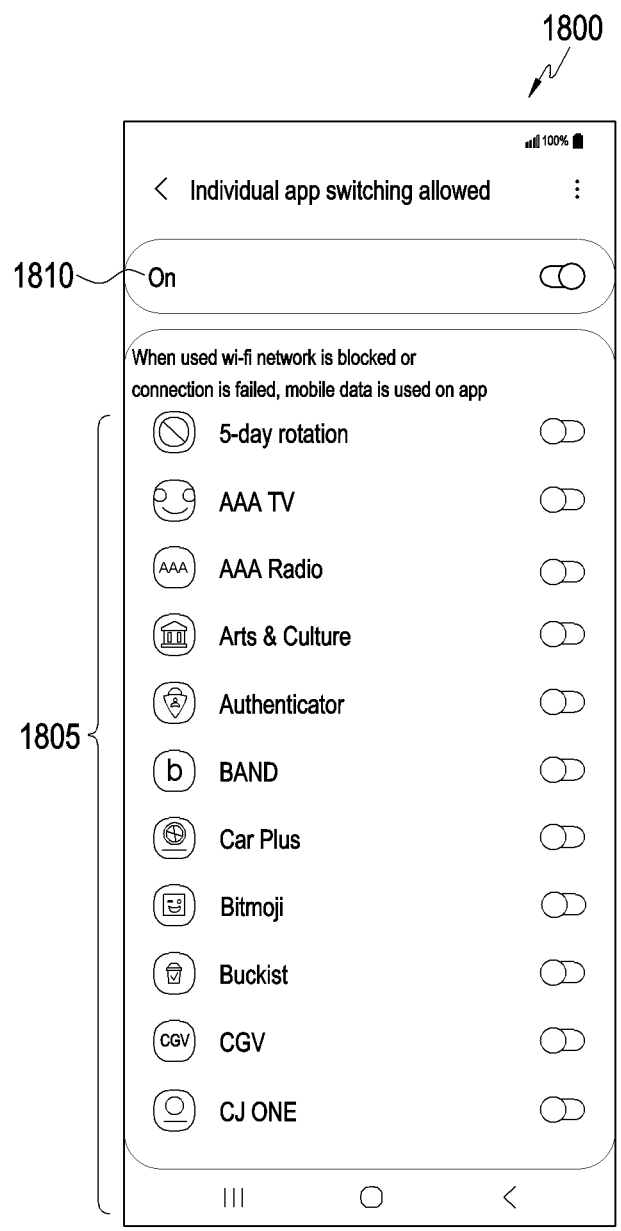

101. For example, APPs #11, 12, 13, and 15 may be specified as "N" (no switching to a cellular network allowed), and APP#14 may be specified as "Y" (switching to a cellular network allowed). According to an embodiment, the network switching permission information 1600 may be configured through a setting menu 1800 as illustrated in FIG. 18. A detailed description of FIG. 18 will be given later.

In operation 1430, the processor 120 may determine whether switching to a cellular network is allowed for the application based on the network switching permission information. When the network switching permission information indicates switching to a cellular network is allowed for the application, the procedure proceeds to operation 1435 to select a cellular network as a backbone network for the tethering service of the application. On the contrary, when the network switching permission information does not indicate that switching to a cellular network is allowed for the application, the procedure proceeds to operation 1440 to notify the external electronic device that the tethering service is not available.

In an embodiment, when the network switching permission information indicates that switching to the cellular network is not allowed for the application in operation 1430, or when determining that the tethering service is not available for the application through the current WiFi connection in operation 1420, the processor 120 may inquire to the user through the external electronic device whether to connect the application to the cellular network. For example, the processor 120 may output a message asking whether to agree to use the cellular network for the application of the external electronic device through the external electronic device or the display (e.g., the display module 160) of the electronic device 101. When a user input indicates consent, the processor 120 may select the cellular network for the tethering service of the application.

FIGS. 17 and 18 illustrate setting menus 1700 and 1800 for configuration information used to select a backbone network for a tethering service according to various embodiments of the disclosure.

Referring to FIG. 17, the electronic device 101 (e.g., the electronic device 215) capable of providing the tethering service or an external electronic device (e.g., the first external electronic device 205 or the second external electronic device 210) capable of accessing the electronic device 101 to receive the tethering service may display the setting menu 1700 for setting preferred network information for each application to a display module (e.g., the display module 160). The setting menus 1700 may include an item 1710 for setting whether to use preferred network information, and a plurality of items 1705 for setting whether to use only a cellular network for each of a plurality of applications installed in the electronic device 101 or the external electronic device.

In an embodiment, the external electronic device may be configured with preferred network information by the user, and transmit the configured preferred network information to the electronic device 101 before, at the start, or during the tethering service. In an embodiment, the external electronic device may share the same user account with the electronic device 101 or the external electronic device may be allowed or configured to use the same preferred network information as the electronic device 101. The electronic device 101 may select a backbone network for the tethering service of the external electronic device by applying its own preferred network information. When an application configured for a cellular network only according to the preferred network information is executed by the external electronic device, the electronic device 101 may select a cellular network as the backbone network of the tethering service for the application.

Referring to FIG. 18, the electronic device 101 (e.g., the electronic device 215) capable of providing the tethering service or an external electronic device (e.g., the first external electronic device 205 or the second external electronic device 210) capable of accessing the electronic device 101 to receive the tethering service may display the setting menu 1800 for setting network switching permission information for each application to the display module (e.g., the display module 160). The setting menu 1800 may include an item 1810 for setting whether to use network switching permission information, and a plurality of items 1805 for setting whether to allow switching to a cellular network for each of a plurality of applications installed in the electronic device 101 or the external electronic device.

In an embodiment, the external electronic device may be configured with network switching permission information by the user, and transmit the configured network switching permission information to the electronic device 101 before, at the start, or during the tethering service. In an embodiment, the external electronic device may share the same user account with the electronic device 101 or the external electronic device may be allowed or configured to use the same preferred network information as the electronic device 101. The electronic device 101 may select a backbone network for the tethering service of the external electronic device by applying its own network switching permission information. When an application configured as allowed for network switching according to the network switching permission information is executed by the external electronic device, and a connection to a WiFi network for the tethering service of the application is blocked or failed, the electronic device 101 may select a cellular network as the backbone network of the tethering service for the application.

Figure 20:
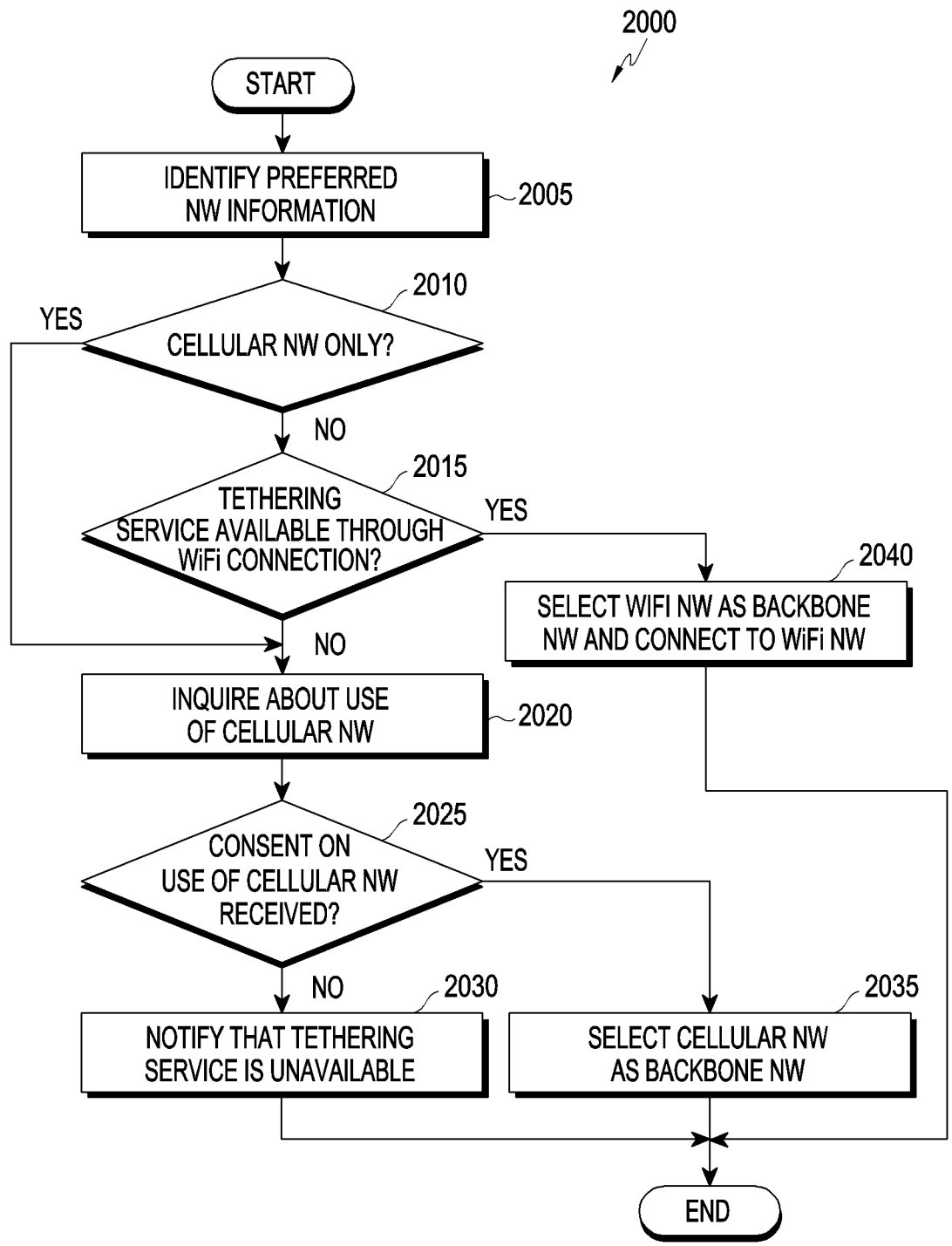
FIG. 20 is a flowchart illustrating an operation of inquiring about a user intention for a tethering service according to an embodiment of the disclosure.

FIG. 20 is a flowchart 2000 illustrating an operation of inquiring about a user intention for a tethering service according to an embodiment of the disclosure. Operations of the flowchart 2000 illustrated as an embodiment may substitute for operation 1220 of FIG. 12.

Referring to FIG. 20, in operation 2005, the processor 120 may identify preferred network information related to an application executed an external electronic device (e.g., the first external electronic device 205) that accesses the electronic device 101 (e.g., the electronic device 215), for a tethering service. In operation 2010, the processor 120 may determine whether the preferred network information indicates that the application is for a cellular network only. When the preferred network information indicates that the application is for a cellular network only, the procedure may proceed to operation 2020. On the contrary, when the preferred network information does not indicate that the application is for a cellular network only, the processor 120 may determine whether the tethering service is available for the application through a current WiFi connection of the electronic device 101 in operation 2015. When a currently connected AP allows a service connection of the application, or when at least one AP capable of the tethering service for the application is detected in the vicinity of the electronic device 101, the processor 120 may select a WiFi network as a backbone network for the tethering service of the application, and when needed, establish a connection to the WiFi network in operation 2040. In an embodiment, the processor 120 may use QoS information related to the application to select the WiFi network. The processor 120 may search for a WiFi network suitable for the QoS information by referring to the QoS information related to the specified application, and select the detected WiFi network as the backbone network.

In operation 2020, the processor 120 may output a screen inquiring about a user's intention as to whether to accept a connection to a cellular network through the display module (e.g., the display module 160) of the electronic device 101. In an embodiment, the inquiry screen may include an inquiry message window 2100 illustrated in FIG. 21.

Figure 21:
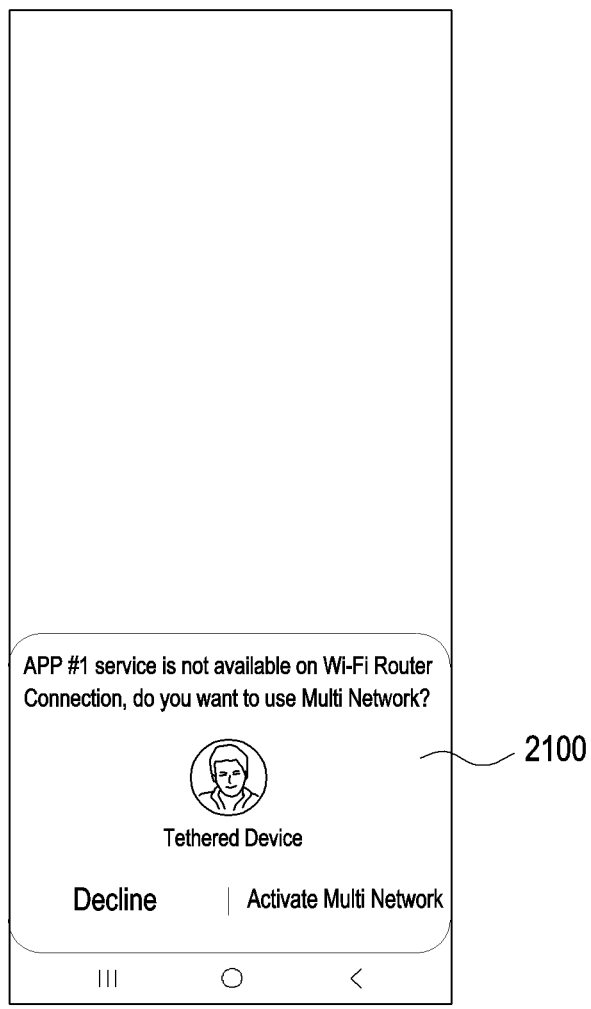
FIG. 21 is a diagram illustrating an example of an inquiry message window for inquiring about a user intention according to an embodiment of the disclosure.

FIG. 21 is a diagram illustrating an example of an inquiry message window for inquiring about a user intention according to an embodiment of the disclosure.

Referring to FIG. 21, the inquiry message window 2100 may include a message inquiring whether to use multiple networks when the WiFi connection is not available. For example, the inquiry message window 2100 may include a message inquiring the user whether to allow a connection to a cellular network, when the WiFi connection is not available. In an embodiment, the processor 120 may determine whether the connection to the cellular network is allowed or prohibited, based on configuration information previously input by the user, independently of the inquiry about the user's intention. In an embodiment, when the application executed in the external electronic device is for emergency communication (e.g., an SOS request), the processor 120 may determine that the connection to the cellular network is allowed regardless of a user setting or billing.

When determining that the connection to the cellular network is allowed based on a user input or a user setting, the processor 120 may determine that the cellular network connection is available for the tethering service of the application executed in the external electronic device in operation 2025, and select the cellular network as the backbone network for the tethering service of the application in operation 2035. On the contrary, when determining that the use of the cellular network is rejected, the processor 120 may determine that the cellular network connection is not available for the tethering service of the application executed in the external electronic device in operation 2025, and notify the external electronic device that the tethering service of the application is not available in operation 2030.

In an embodiment, when the electronic device 101 is a mobile device, the electronic device 101 may determine whether multi-network support is possible for backbone network selection according to various embodiments of the disclosure. In terms of billing, when the backbone network is a cellular network subject to billing, consent of the user who possesses the electronic device 101 may be received in order to support multiple networks. Further, in terms of current consumption, when instead of one network, multiple networks are used as the backbone network, for example, a network for data communication of the electronic device 101 and at least one network for the tethering service for the external electronic device are used, power consumption of the electronic device 101 may be significant. In this case, the user's consent may be received in consideration of whether the electronic device 101 is in a charging state. In terms of network policy, to allow the electronic device 101 to use configuration information such as preferred network information and/or network switching permission information set by the user of the external electronic device using the tethering service, consent of the user of the external electronic device may be received. When the external electronic device shares the same user account with the electronic device 101, the user's consent on whether to apply configuration information of the electronic device 101 to the tethering service of the external electronic device may be received.

Figure 22A:
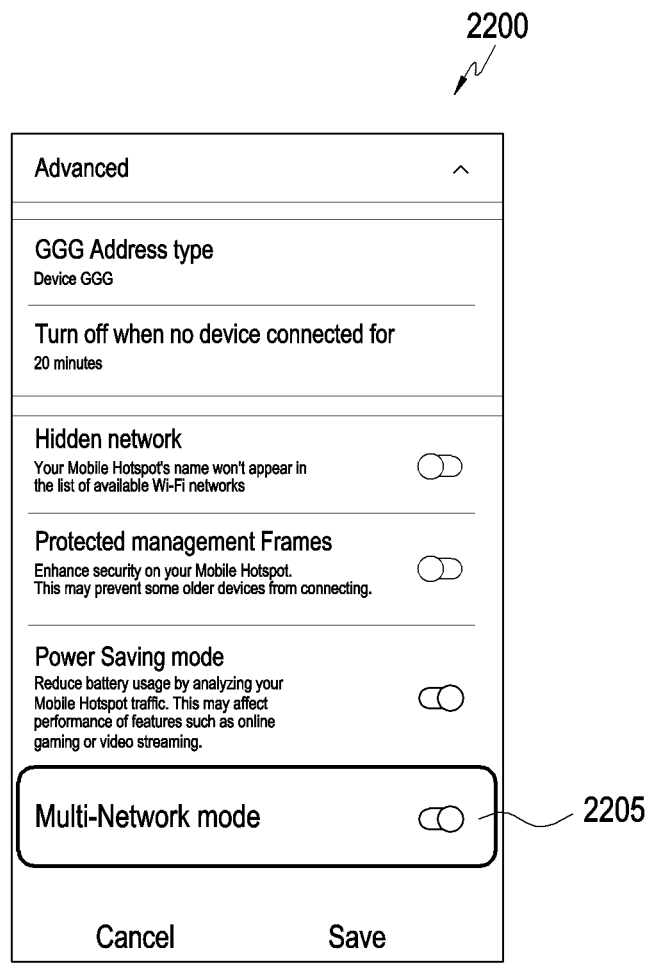
FIGS. 22A and 22B are diagrams illustrating a setting menu and an inquiry message window for activating multi-network support according to various embodiments of the disclosure.
Figure 22B:
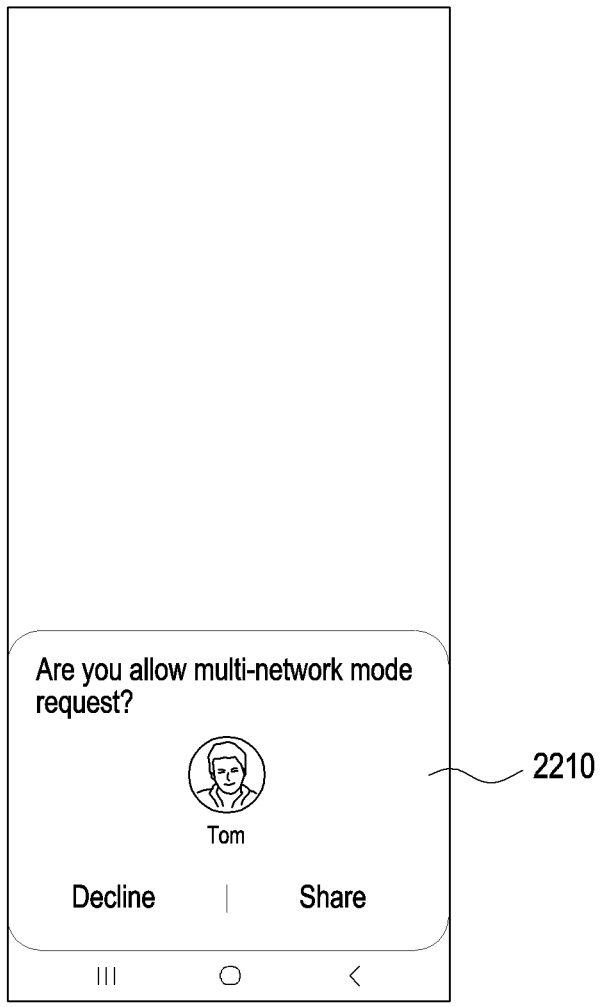

FIGS. 22A and 22B illustrate a setting menu 2200 and an inquiry message window 2210, for activating multi-network support according to various embodiments of the disclosure.

Referring to FIG. 22A, the processor 120 of the electronic device 101 (e.g., the electronic device 215) may output an item 2205 inquiring whether to activate a display multi-network mode through the display module 160. When the item 2205 is set to be activated by the user, the processor 120 may determine that multiple networks including a WiFi network and a cellular network are accessible for a tethering service. Also, the processor 120 may determine that configuration information for Internet connection of applications is applicable to an external electronic device using the same user account.

Referring to FIG. 22B, the processor 120 of an external electronic device (e.g., the first external electronic device 205 or the second external electronic device 210) using a tethering service may detect that a service requested by an application is restricted in an AP of a WiFi network, and output an inquiry message window 2100 asking whether to use multiple network through the display module 160. Upon receipt of a user input for activating multi-network use, the processor 120 may transmit information indicating that multi-network use is allowed to the electronic device 101 providing the tethering service. On the contrary, upon receipt of a user input rejecting multi-network use, the processor 120 may transmit information indicating that multi-network use is not allowed to the electronic device 101 providing the tethering service.

According to an embodiment, a method performed by an electronic device (e.g., the electronic device 101 or the electronic device 215) may include establishing a tethering connection between the electronic device and an external electronic device (e.g., the first external electronic device 205 or the second external electronic device 210) through a wireless communication module (e.g., the wireless communication module 192) (e.g., operation 1205), obtaining at least one piece of information related to an Internet connection of at least one application executable in the external electronic device (e.g., operation 1210), selecting a backbone network for a specified application among the at least one application executable in the external electronic device, based on the at least one piece of information (e.g., operation 1220), mapping a tethering connection for the specified application to the selected backbone network (e.g., operation 1225), and transmitting data received from the specified application of the external electronic device to the mapped backbone network (e.g., operation 1230).

In an embodiment, the selected backbone network may include at least one of at least one cellular network or at least one WiFi network.

In an embodiment, the at least one piece of information may include preferred network information indicating a specified network type for each of the at least one application executable in the external electronic device, and the network type may include at least one of cellular network only, minimum round trip time (RTT)-network first, WiFi network only, or any.

In an embodiment, the at least one piece of information may include network switching permission information indicating, for each of the at least one application executable in the external electronic device, that a WiFi network is preferred for the application and when the WiFi network is not available, whether switching to a cellular network is allowed for the application.

In an embodiment, the at least one piece of information may include network connection permission information indicating whether the specified application is blocked or all applications are allowed, for each of at least one AP.

In an embodiment, the obtaining of at least one piece of information may include obtaining the at least one piece of information from at least one of a user, a server, or an external electronic device.

In an embodiment, the obtaining of at least one piece of information may include determining whether configuration information related to the Internet connection of the specified application is stored (e.g., operation 1305), in the absence of the configuration information, determining whether the external electronic device uses the same user account as the electronic device (e.g., operation 1320), and when the external electronic device uses the same user account as the electronic device, obtaining configuration information related to the Internet connection of the specified application, configured for the user account (e.g., operation 1325).

In an embodiment, the selection of a backbone network may include determining whether the backbone network supports a QoS indicated by QoS information related to the specified application, referring to the QoS information.

In an embodiment, the selection of a backbone network may include determining whether the specific application is for the cellular network only based on the at least one piece of information (e.g., operation 1410), when the specific application is not for a cellular network only, and a connection between the electronic device and a WiFi network is available, detecting a WiFi network suitable for QoS information related to the specified application, referring to the QoS information, and selecting the detected WiFi network as the backbone network (e.g., operation 1445), when the specific application is not for the cellular network only, and a connection between the electronic device and the WiFi network is not available, determining whether switching to the cellular network is allowed for the specified application (e.g., operation 1430), when switching to the cellular network is allowed for the specified application, selecting the cellular network as the backbone network (e.g., operation 1435), and when switching to the cellular network is not allowed for the specified application, terminating a tethering service (e.g., operation 1440).

In an embodiment, the selection of a backbone network may include determining whether a tethering service is available for the specified application through a first backbone network currently connected to the electronic device based on the at least one piece of information (e.g., operation 1320), and when the tethering service is not available for the specified application through the first backbone network, detecting a second backbone network for the specified application, and connecting to the second backbone network for the tethering service of the specified application, while maintaining a connection to the first backbone network for data communication of the electronic device (e.g., operation 1325).

In an embodiment, the selection of a backbone network may comprise receiving, from an element of the backbone network, a notification indicating that a first Internet connection for the at least one application is unavailable, and transmitting, to the external electronic device, a query for multi-network activation.

In embodiment, the method may comprise receiving, from the external electronic device, a response to the query requesting connection to a second Internet connection for the at least one application; and selecting a backbone network corresponding to the second Internet connection.

According to various embodiments, a host device (e.g., the electronic device 215) selects and maps an appropriate backbone network according to a network service requested by a client device (e.g., the first external electronic device 205 or the second external electronic device 210) using a tethering service. Therefore, a differentiated routing service and an Internet service optimized for each application of an external electronic device may be provided. According to various embodiments, the client device (e.g., the first external electronic device 205 or the second external electronic device 210) is enabled to maintain the same network experience as the host device (e.g., the electronic device 215), thereby enabling a more efficient network operation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a wireless communication module;
memory storing one or more computer programs; and
one or more processors communicatively coupled to the wireless communication module and the memory,
wherein the one or more computer programs include computer-executable instructions that, when executed by the one or more processors individually or collectively, cause the electronic device to:
establish a tethering connection between the electronic device and an external electronic device through the wireless communication module,
obtain at least one piece of information related to at least one application executable in the external electronic device,
select one of a cellular network or a WiFi network as a backbone network for providing the tethering connection with respect to a specified application among the at least one application executable in the external electronic device based on the at least one piece of information,
provide the tethering connection for the specified application executed in the external electronic device using the selected backbone network, and
transmit data received from the specified application of the external electronic device to the selected backbone network,
wherein the at least one piece of information includes network switching permission information indicating, for each of the at least one application executable in the external electronic device, that the WiFi network is preferred for the application and when the WiFi network is not available, whether switching to the cellular network is allowed for the application.

2. The electronic device of claim 1,
wherein the at least one piece of information includes the preferred network information indicating a specified network type for each of the at least one application executable in the external electronic device, and wherein the network type includes at least one of cellular network only, minimum round trip time (RTT)-network first, WiFi network only, or any of the cellular network or the WiFi network.

3. The electronic device of claim 1, wherein the at least one piece of information includes network connection permission information indicating whether the specified application is blocked or all applications are allowed, for each of at least one access point (AP).

4. The electronic device of claim 1, wherein the one or more computer programs further include computer-executable instructions that, when executed by the one or more processors individually or collectively, cause the electronic device to obtain the at least one piece of information from at least one of a user, a server, or an external electronic device.

5. The electronic device of claim 1, wherein the one or more computer programs further include computer-executable instructions that, when executed by the one or more processors individually or collectively, cause the electronic device to:
determine whether configuration information related to an Internet connection of the specified application is stored,
in an absence of the configuration information, determine whether the external electronic device uses a same user account as the electronic device, and
when the external electronic device uses the same user account as the electronic device, obtain configuration information related to the Internet connection of the specified application, configured for the user account.

6. The electronic device of claim 1, wherein the one or more computer programs further include computer-executable instructions that, when executed by the one or more processors individually or collectively, cause the electronic device to determine whether the backbone network supports a quality of service (QOS) indicated by QoS information related to the specified application, referring to the QoS information.

7. The electronic device of claim 1, wherein the one or more computer programs further include computer-executable instructions that, when executed by the one or more processors individually or collectively, cause the electronic device to:
determine whether the specified application is for the cellular network only, based on the at least one piece of information,
when the specified application is not for the cellular network only, and a connection between the electronic device and a WiFi network is available, detect the WiFi network suitable for quality of service (QOS) information related to the specified application, referring to the QoS information, and select the detected WiFi network as the backbone network,
when the specified application is not for the cellular network only, and a connection between the electronic device and the WiFi network is not available, determine whether switching to the cellular network is allowed for the specified application based on the at least one piece of information,
when switching to the cellular network is allowed for the specified application, select the cellular network as the backbone network, and
when switching to the cellular network is not allowed for the specified application, terminate a tethering service to the external electronic device.

8. The electronic device of claim 1, wherein the one or more computer programs further include computer-executable instructions that, when executed by the one or more processors individually or collectively, cause the electronic device to:
determine whether a tethering service is available for the specified application through a first backbone network currently connected to the electronic device, based on the at least one piece of information,
when the tethering service is not available for the specified application through the first backbone network, detect a second backbone network for the specified application, and
connect to the second backbone network for the tethering service of the specified application, while maintaining a connection to the first backbone network for data communication of the electronic device.

9. A method performed by an electronic device, the method comprising:
establishing a tethering connection between the electronic device and an external electronic device through a wireless communication module;
obtaining at least one piece of information related to at least one application executable in the external electronic device;
selecting one of a cellular network or a WiFi network as a backbone network for providing the tethering connection with respect to a specified application among the at least one application executable in the external electronic device, based on the at least one piece of information;
providing the tethering connection for the specified application executed in the external electronic device using the selected backbone network; and
transmitting data received from the specified application of the external electronic device to the mapped selected backbone network,
wherein the at least one piece of information includes network switching permission information indicating, for each of the at least one application executable in the external electronic device, that the WiFi network is preferred for the application and when the WiFi network is not available, whether switching to the cellular network is allowed for the application.

10. The method of claim 9, wherein the at least one piece of information includes:
the preferred network information indicating a specified network type for each of the at least one application executable in the external electronic device, wherein the network type includes at least one of cellular network only, minimum round trip time (RTT)-network first, WiFi network only, or any of the cellular network or the WiFi network.

11. The method of claim 9, wherein the at least one piece of information includes:
network connection permission information indicating whether the specified application is blocked or all applications are allowed, for each of at least one access point (AP).

12. The method of claim 9,
wherein the at least one piece of information is obtained from at least one of a user, a server, or an external electronic device.

13. The method of claim 9, wherein the obtaining of at the at least one piece of information comprises:

determining whether configuration information related to an Internet connection of the specified application is stored;

in an absence of the configuration information, determining whether the external electronic device uses a same user account as the electronic device; and when the external electronic device uses the same user account as the electronic device, obtaining configuration information related to the Internet connection of the specified application, configured for the user account.

14. The method of claim 9, wherein the selecting comprises:

determining whether the backbone network supports a quality of service (QOS) indicated by QoS information related to the specified application, referring to the QoS information.

15. The method of claim 9, wherein the selection of the backbone network comprises:

determining whether the specified application is for a cellular network only based on the at least one piece of information;

when the specified application is not for the cellular network only, and a connection between the electronic device and a WiFi network is available, detecting the WiFi network suitable for quality of service (QOS) information related to the specified application, referring to the QoS information, and selecting the detected WiFi network as the backbone network;

when the specified application is not for the cellular network only, and a connection between the electronic device and the WiFi network is not available, determining whether switching to the cellular network is allowed for the specified application;

when switching to the cellular network is allowed for the specified application, selecting the cellular network as the backbone network; and when switching to the cellular network is not allowed for the specified application, terminating a tethering service.

16. The method of claim 9, wherein the selection of the backbone network comprises:

determining whether a tethering service is available for the specified application through a first backbone network currently connected to the electronic device based on the at least one piece of information, when the tethering service is not available for the specified application through the first backbone network, detecting a second backbone network for the specified application, and connecting to the second backbone network for the tethering service of the specified application, while maintaining a connection to the first backbone network for data communication of the electronic device.

* * * * *